US010740504B2

(12) United States Patent
Treptow et al.

(10) Patent No.: US 10,740,504 B2
(45) Date of Patent: Aug. 11, 2020

(54) FIBER CHANNEL VERIFICATION SOFTWARE WEB APPLICATION

(71) Applicant: LEVITON MANUFACTURING CO., INC., Melville, NY (US)

(72) Inventors: Jay Treptow, Sammamish, WA (US); Frank Chin Hwan Kim, Woodinville, WA (US); Scott T. Robinson, Redmond, WA (US); Sean McCloud, Bothell, WA (US); Adrian Young, Everett, WA (US); Dennis Manes, Mill Creek, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 579 days.

(21) Appl. No.: 15/609,806

(22) Filed: May 31, 2017

(65) Prior Publication Data

US 2018/0349524 A1 Dec. 6, 2018

(51) Int. Cl.

*G06F 30/18* (2020.01)
*H04L 12/24* (2006.01)
*G06F 30/20* (2020.01)
*G06F 30/398* (2020.01)
*G06F 113/16* (2020.01)

(52) U.S. Cl.

CPC .............. *G06F 30/18* (2020.01); *G06F 30/20* (2020.01); *H04L 41/145* (2013.01); *G06F 30/398* (2020.01); *G06F 2113/16* (2020.01)

(58) Field of Classification Search

CPC .. G02B 27/0012; G02B 19/0061; G02B 3/08; G02B 19/0009; G06F 30/18; G06F 30/20; G06F 30/398; G06F 2113/16; H04L 41/145

USPC .............................................................. 703/1

See application file for complete search history.

(56) References Cited

U.S. PATENT DOCUMENTS 7,295,960 B2 * 11/2007 Rappaport ............ G06F 17/509 455/403
8,942,956 B1 * 1/2015 Perry ...................... H04L 45/22 703/1
2006/0045523 A1 * 3/2006 Kozischek ............ H04L 41/145 398/58

* cited by examiner

*Primary Examiner* — Juan C Ochoa

(74) *Attorney, Agent, or Firm* — Amin, Turocy & Watson, LLP

(57) ABSTRACT

A fiber channel verification system provides a fiber optic network design platform that allows a user to create a graphical mock-up of a fiber optic network design, and performs fault analytics on the proposed design to identify potential faults or problems with the design. The verification system can guide the user through the process of specifying network components such as trunk cables, patch cables, fiber optic cassettes, connectors, or other such components suitable for a given networking application. The verification also allows the user to define connections between the selected components. During development or after the design is complete, the verification system can analyze each channel of network design and identify improper fiber connections, network component incompatibilities, incorrect polarities, excessive insertion or return losses, or other such problems. The verification system can also provide recommendations for eliminating discovered problems where appropriate.

20 Claims, 19 Drawing Sheets

1002

1104 1106 1108

| Bill of Materials | | | |
|---|---|---|---|
| # | Part Number | Description | Qty |
| 1 | FPC-M3PD1CC019FAB | **Fiber Optic Cable Assemblies (Premium)**<br>**Assembly Type:** Fiber Patch Cord, **Fiber Type:** 50/125μm (10G, 300m) Multimode (OM3), **Cable Rating:** Plenum, **Cable Type:** Duplex Zipcord 1.6mm, **First End Connector:** LC, **Second End Connector:** LC, **Length:** 019, **Unit of Measure:** Feet, **Polarity:** A-B (Standard) | 24 |
| 2 | 31SM1-BCN | **HDX MTP Cassettes**<br>**Fiber Type:** 50/125μm (10G, 300m) Multimode (OM3), **Fiber Count:** 12, **Connector Type (Front):** SC, **MTP Fiber Count (Rear):** 8-fiber MTP (male), **Polarity:** Method B, Core | 2 |
| 3 | FT-EB024LL038F12C12C-N-NNBC | **Unity 40-100G MTP Trunk Cable**<br>**Fiber Type:** 50/125um (10G, 300m) Multimode (OM3), **Cable Type:** Indoor/Outdoor Plenum, **Fiber Count:** 24 **1st End Termination:** Premium 12F MTP (female) STANDARD, **2nd End Termination:** Premium 12F MTP (female) STANDARD, **Cable Length:** 038, **Units:** Feet, **1st End Breakout Length (inches):** 12, **1st End Breakout legs:** 3mm, **2nd End Breakout Length (inches):** 12, **2nd End Breakout Legs:** 3mm, **Pulling Eye:** No, **1sh End Stagger:** No, **2nd End Stagger:** No, **Polarity:** B (Standard), **Labeling:** Custom | 1 |
| 4 | 31SM1-BEN | **HDX MTP Cassettes**<br>**Fiber Type:** 50/125μm (10G, 300m) Multimode (OM3), **Fiber Count:** 12, **Connector Type (Front):** SC, **MTP Fiber Count (Rear):** 8-fiber MTP (male), **Polarity:** Method B, Edge | 2 |

FIG. 11

FIBER CHANNEL VERIFICATION SOFTWARE WEB APPLICATION

TECHNICAL FIELD

The disclosed subject matter relates generally to fiber optic network design and, for example, to techniques for verifying integrity and functionality of fiber optic network designs.

BACKGROUND

Fiber optic networks are often used in telecommunication and device networking applications due to their flexibility, high data capacity, and immunity to interference. Since light is used as the data transmission medium, fiber optic cables can carry data over long distances with little attenuation relative to electrical data transmission. Fiber optic cables and associated networking components—including but not limited to trunk cables, patch cables, fiber optic switches, connectors, fiber optic cassettes, etc. —are used in many types of applications, including local area networks that use optical transceivers, corporate intranets that deploy optical pathways for high-speed transmission of data on a corporate campus, or other such data transmission applications.

A fiber network channel (or light path) connecting two end devices or transceivers may pass through several fiber optic cables, cable connectors, devices (e.g., switches or other networking device), fiber optic cassettes, splices, or other components. When designing fiber optic networks, designers must take care to select appropriate network components—and connect these components properly—to ensure that each fiber network channel correctly passes light from a source transceiver to its corresponding destination transceiver. Moreover, each channel must be designed such that the number and types of components through which the light passes does not cause a significant degradation of the light signal.

The above-described deficiencies of conventional patch panel systems are merely intended to provide an overview of some of the problems of current technology, and are not intended to be exhaustive. Other problems with the state of the art may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Embodiments described herein relate to a fiber channel verification system configured to verify that channels of a fiber optic network design correctly pass light from a source transceiver to a corresponding destination transceiver, and that estimated losses associated with each channel are within acceptable tolerances. In one or more embodiments, the fiber channel verification system provides a network design platform that allows a user to create a graphical mock-up of a fiber optic network design. The verification system can guide the user through the process of specifying network components such as trunk cables, patch cables, fiber optic cassettes, connectors, or other such components suitable for a given networking application. The verification also allows the user to define connections between the selected components.

During development or after the design is complete, the verification system can analyze the resulting project data and identify improper fiber connections, network component incompatibilities, incorrect polarities, excessive insertion or return losses, or other such problems. The verification system can also provide recommendations for eliminating discovered problems where appropriate. After the network design has been verified, the verification system can export the design as a drawing file, a bill of materials file, or another supported format. The verification system can also generate report data summarizing results of the verification process for record-keeping purposes.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 11 is a section of an example bill of materials document that can be generated by the fiber network export component based on the fiber network definition data.

DETAILED DESCRIPTION

Figure 1:
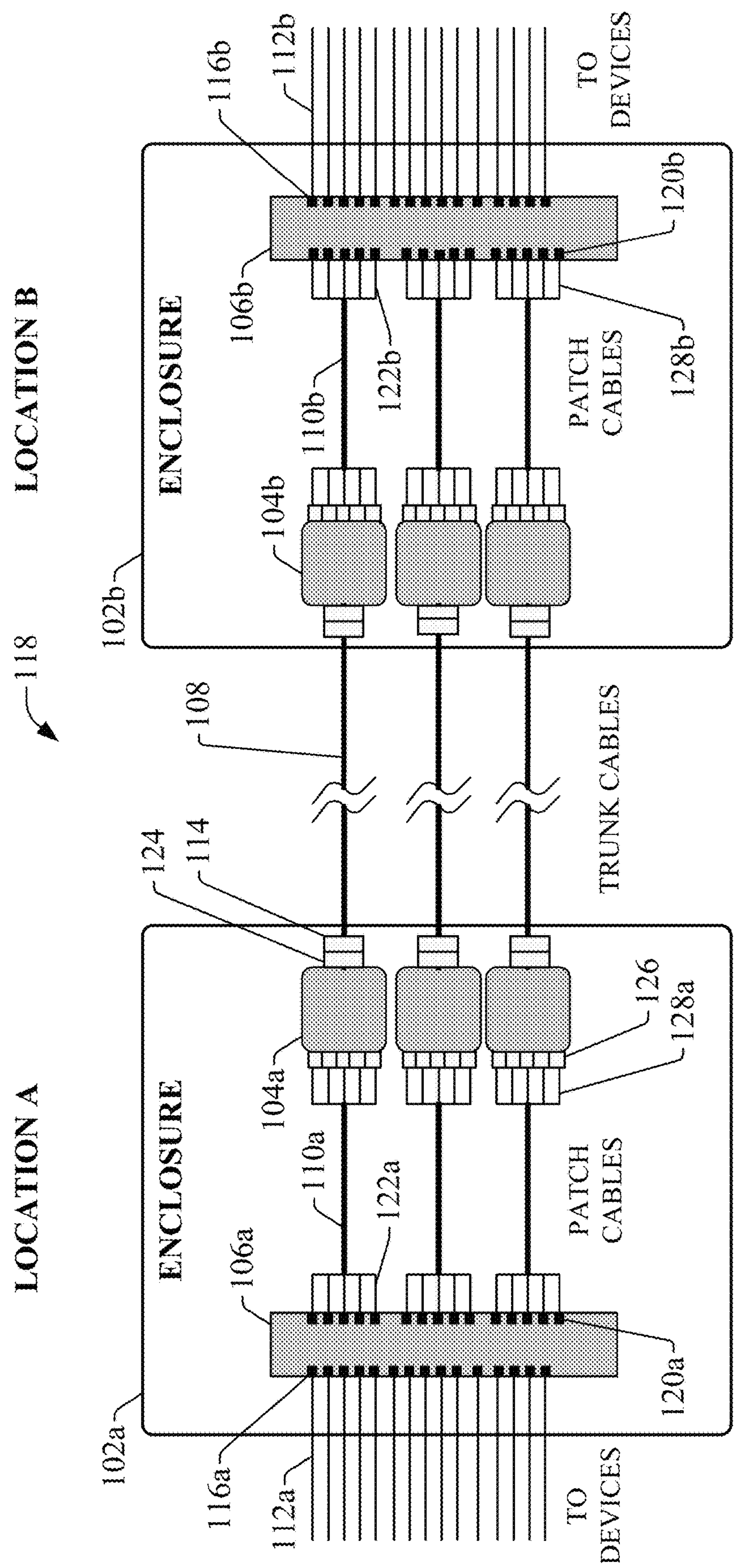
FIG. 1 is a generalized diagram depicting an example fiber network.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in the subject specification and drawings, the terms "object," "module," "interface," "component," "system," "platform," "engine," "selector," "manager," "unit," "store," "network," "generator" and the like are intended to refer to a computer-related entity or an entity related to, or that is part of, an operational machine or apparatus with a specific functionality; such entities can be either hardware, a combination of hardware and firmware, firmware, a combination of hardware and software, software, or software in execution. In addition, entities identified through the foregoing terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

FIG. 1 is a generalized diagram depicting an example fiber network 118. In this example, two telecommunication wiring enclosures 102*a* and 102*b* are located in respective two locations (Location A and Location B). Enclosures 102*a* and 102*b* may be, for example, metal enclosures that house equipment racks within which fiber optic networking and organization devices can be installed. Each of the two enclosures 102*a* and 102*b* houses a fiber optic switch 106*a* and 106*b* whose front data ports 116*a* and 116*b* are connected to one or more field devices (not shown) via optical fibers or copper cables 112*a* and 112*b* plugged into the front data ports 116*a* and 116*b*. Fiber optic switches 106*a* and 106*b* are configured to selectively switch data traffic between the front data ports 116*a*, 116*b* and rear data ports 120*a*, 120*b*.

Optical channels of fiber network 118 extend between fiber optic switch 106*a* and fiber optic switch 106*b*, where each channel comprises a light path between a rear data port 120*a* on fiber optic switch 106*a* and a rear data port 120*b* on fiber optic switch 106*b*. The channels are carried between the two enclosures 102*a* and 102*b* by one or more fiber optic trunk cables 108 containing multiple optical fibers over which the channels are transmitted. Although the trunk cables 108 are depicted in FIG. 1 as continuous cables routed between the enclosures 102*a* and 102*b*, in some scenarios the trunk cables 108 may pass through one or more intermediate networking or connectivity components, including but not limited to fiber optic connectors that serially connect multiple trunk cables, network architecture devices such as routers or hubs, or other such devices.

Figure 2:
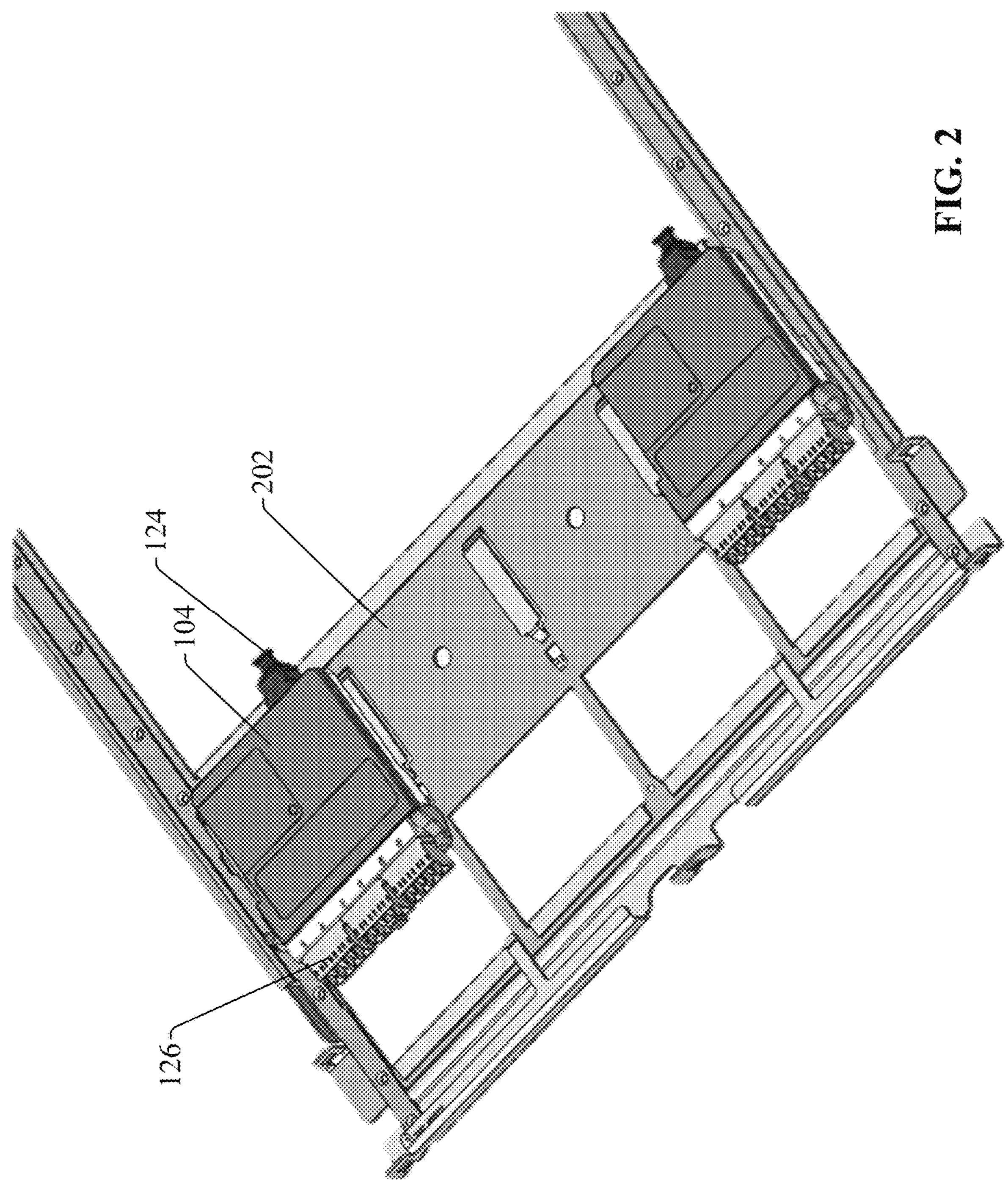
FIG. 2 is a view of an example fiber optic tray on which are mounted example fiber optic cassettes.

In the illustrated example, one or more fiber optic cassettes 104*a* and 104*b* are mounted within each enclosure 102*a* and 102*b* and used to organize and manage fiber optic connections within the enclosures 102*a* and 102*b*. In some implementations, fiber optic cassettes 104*a* and 104*b* may be mounted on one or more fiber optic trays that are rack-mounted within the respective enclosures 102*a* and 102*b*. FIG. 2 is a view of an example fiber optic tray 202 on which are mounted example fiber optic cassettes 104.

In the cassette-based system illustrated in FIG. 1, a trunk cable 108 may be terminated with a connector 114 (e.g., an MTP connector) that plugs into a mating connector 124 on the rear side of a fiber optic cassette 104*a*, 104*b* (see also FIG. 2 for a depiction of an example mating connector 124 on the rear side of example fiber optic cassette 104). The mating connector 124 terminates first ends of multiple individual optical fibers (not shown) inside the cassette 104*a*, 104*b*, and these individual optical fibers are terminated on their second ends by fiber optic adapters 126 mounted in a row along the front of each fiber optic cassette 104*a*, 104*b* (see also FIG. 2 for a depiction of example fiber optic adapters 126 along the front of example fiber optic cassette 104).

Inside each enclosure 102*a*, 102*b*, patch cables 110*a*, 110*b* are used to connect the optical fibers within each cassette 104*a*, 104*b* to rear data ports 120*a*, 120*b* of fiber optic switch 106*a*, 106*b*. Each patch cable 110*a*, 110*b* can contain multiple individual optical fibers, the first ends 128*a* of which are connectorized to plug into the fiber optic adapters 126 on the front sides of fiber optic cassettes 104*a*, 104*b*. The second ends 122*a*, 122*b* of the patch cable fibers are connectorized to plug into the rear data ports 120*a*, 120*b* of fiber optic switch 106*a*, 106*b*. This configuration of trunk cables 108, fiber optic cassettes 104*a*, 104*b*, patch cables 110*a*, 110*b*, and any intermediate devices connected in line with the trunk cables 108 provides connectivity between the two fiber optic switches 106*a* and 106*b* within the respective two enclosures 102*a* and 102*b*.

It is to be appreciated that the generalized fiber optic network 118 depicted in FIG. 1—as well as the example cassettes 104, connector 124, and adapters 126 illustrated in FIG. 2—are only intended to be exemplary, and that the techniques described herein are not limited to use in connection with such fiber optic networks. Rather, embodiments of the fiber channel verification system and methods described herein can be used to verify fiber network channels for substantially any fiber optic network, and are not limited to networks comprising specific devices, cables, and connection components described herein.

A given channel of a fiber optic network can traverse many devices and connection points. The process of designing a fiber optic network—including specifying the network components (e.g., cables, devices, cassettes, connectors, etc.) that make up the network and defining the connections between these components—is prone to error. If incorrect or incompatible network components are selected, or if two components of the network are connected improperly, a fiber network channel may not correctly pass a light signal from its source device or data port to the intended destination device or data port. Typically, in order to verify the integrity of a fiber optic network design, designers must map out the network design as a drawing and visually verify that the correct components appear to be specified and that each connection appears to be correct. However, such visual verifications are prone to human error, and design errors can easily be missed. As an alternative verification method, designers may build the fiber optic network—either in a bench test scenario or as an actual field installation—and perform an I/O test to verify the connectivity of each individual channel. However, in such scenarios, network configuration errors are not discovered until after the network components have been purchased and installed. Consequently, improperly specified components must be removed and returned to the vendor and exchanged for the correct component, and improper network connections must be re-worked in the field.

To address these and other issues, one or more embodiments described herein provide a fiber channel verification system configured to assist in the design and verification of a fiber optic network. In one or more embodiments, the fiber channel verification system provides an interactive network design platform that allows a user to select components to be used in the network design and to define connections between the components. Design selection tools integrated with the system can guide the user through the process of selecting proper connectors, trunk cables, patch cables, fiber optic cassettes, or other devices. Once the user has specified the desired components and connections of the network design, the system can perform validation analysis on the design to identify faults or potential problems with the design. This can include identification of incorrect fiber connections, incompatible components or connectors, incorrect polarities, excessive insertion or return losses, or other such problems. The system can also provide recommendations for eliminating discovered problems when appropriate. The system can also analyze the resulting design file to verify proper connectivity of each channel of the network, ensuring that the channel provides proper connectivity between intended network endpoints. Once the design has been validated, the verification system can save the design as a design file that can be exported in one of several selectable output formats, including but not limited to drawing files (e.g., AutoCad files, portable document format (PDF) files, etc.), bill of material files (e.g., as a word processing document, a PDF file, or a spreadsheet), or other such formats.

Figure 3:
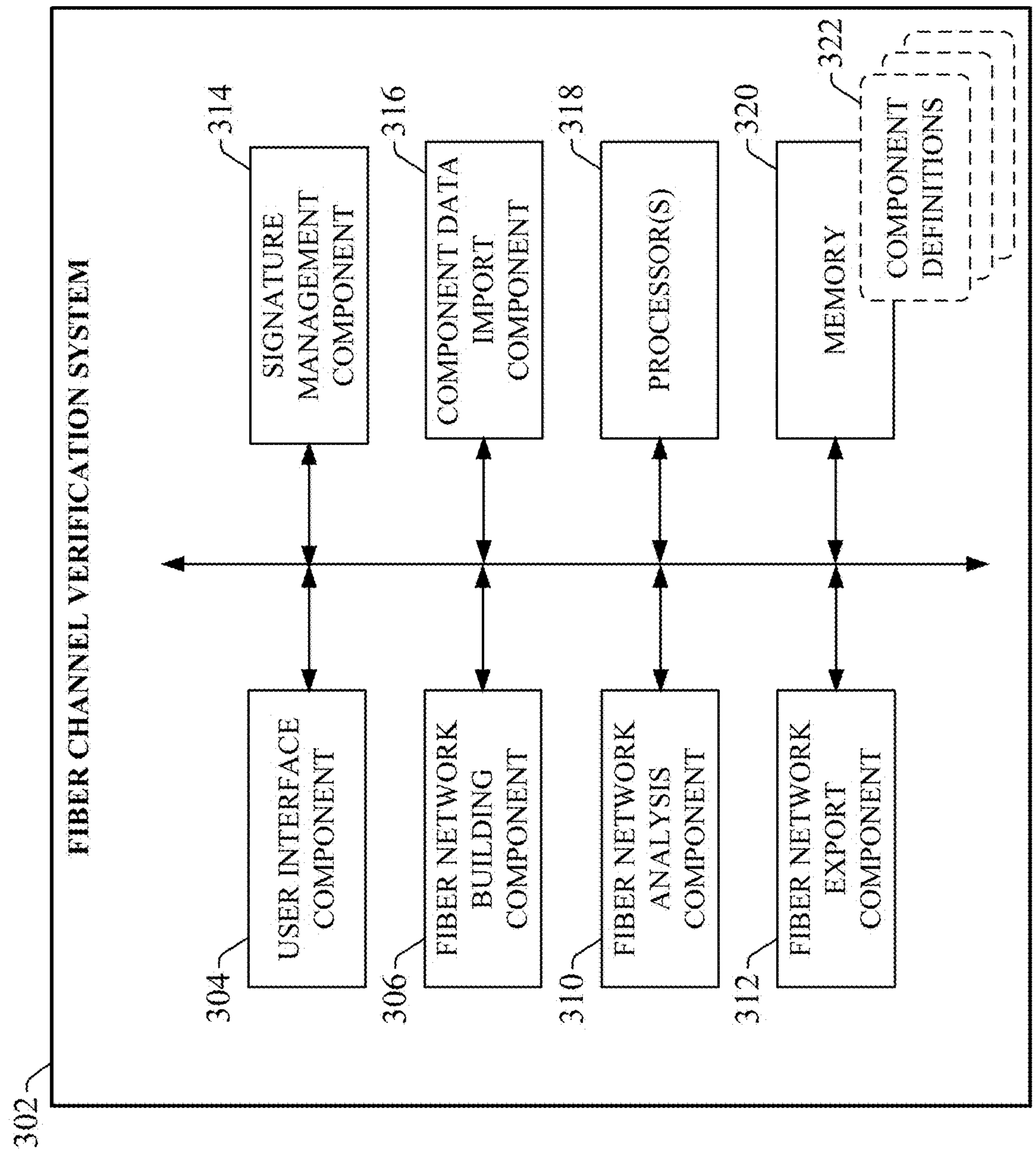
FIG. 3 is a block diagram of an example device fiber channel verification system.

FIG. 3 is a block diagram of an example device fiber channel verification system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Fiber channel verification system 302 may include a user interface component 304, a fiber network building component 306, a fiber network analysis component 310, a fiber network export component 312, a signature management component 314, a component data import component 316, one or more processors 318, and memory 320. In various embodiments, one or more of the user interface component 304, fiber network building component 306, fiber network analysis component 310, fiber network export component 312, signature management component 314, component data import component 316, the one or more processors 18, and memory 320 may be electrically and/or communicatively coupled to one another to perform one or more of the functions of the fiber channel verification system 302. In some embodiments, components 304, 306, 310, 312, 314, and 316 may comprise software instructions stored on memory 320 and executed by processor(s) 318. Fiber channel verification system 302 may also interact with other hardware and/or software components not depicted in FIG. 3. For example, processor(s) 318 may interact with one or more external user interface devices, such as a keyboard, a mouse, a display monitor, a touchscreen, or other such interface devices (not shown).

User interface component 304 can be configured to render a fiber optic network design platform on a client device, to receive configuration input data from the client device, and to render output data to the client device. In one or more embodiments, fiber channel verification system 302 can execute locally on the client device itself, and the user interface component 304 can render the fiber optic network design platform on a display component (e.g., a monitor or display screen) of the client device. Alternatively, fiber channel verification system 302 can execute on a shared server or web-based device, and the user interface component 304 can exchange data with one or more remote client devices having communicative access to the server or web-based device.

Fiber network building component 306 can be configured to process user input data representing fiber network component selections and component assembly and connectivity specifications, and to generate definition data representing the user-defined fiber optic network. The fiber network building component 306 can generate the fiber network definition data in a format that can be analyzed by fiber network analysis component 310, as will be described in more detail herein. Fiber network building component 306 can also be configured to generate a visual representation of the user-defined fiber optic network, which can be displayed on a client device by user interface component 304.

Fiber network analysis component 310 can be configured to analyze the fiber network definition data generated by the fiber network building component 306, and to identify component selection or connectivity problems inherent in the network design. Problems that can be identified by the fiber network analysis component 310 can include, but are not limited to, incorrect connections between two end devices or data ports, improper polarity connections, incompatible cable connectors or other component incompatibilities, excessive insertion loss or return loss for a network channel, non-compliance with industry standards or in-house design rules, or other such issues.

Fiber network export component 312 can be configured to export a verified fiber network design file in a selected format. In various embodiments, the fiber network export component 312 can be configured to convert the fiber network design file to a drawing file (e.g., a Visio file, a PDF file, an AutoCad file, etc.), a bill of materials document or spreadsheet, a web-compatible file (e.g., a hypertext markup language (HTML) file), or another file format.

Signature management component 314 can be configured to manage collection of digital signatures associated with a fiber network design file for embodiments that support electronic signatures. Component data import component 316 can be configured to import component definition files 322 representing fiber optic network components, which can subsequently be selected and imported into a fiber network design. The component definition files 322 can be imported, for example, from a remote repository that maintains up-to-date component definition files 322 for currently available fiber network products. Once imported, the component definition files 322 are stored on memory 320 in a component library, which can be accessed by the fiber network building component 306. Component data import component 316 can also be configured to import design specification data that can be used by the system 302 to select suitable components for a given network design.

The one or more processors 318 may perform one or more of the functions described herein with reference to the systems and/or methods disclosed. Memory 320 may be a computer-readable storage medium storing computer-executable instructions and/or information for performing the functions described herein with reference to the systems and/or methods disclosed.

Figure 4:
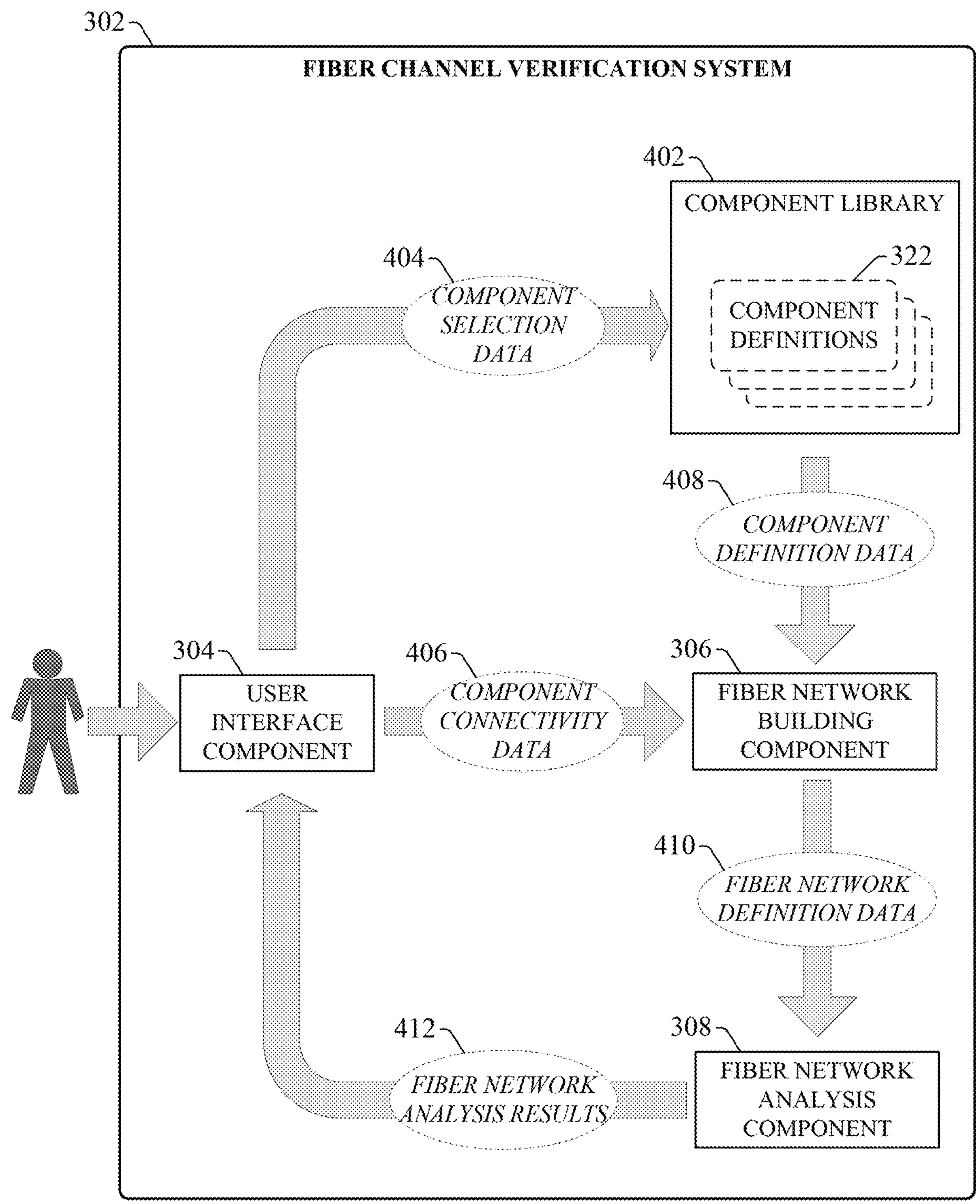
FIG. 4 is a diagram illustrating general data flows and user interactions supported by one or more embodiments of the fiber channel verification system.

FIG. 4 is a diagram illustrating general data flows and user interactions supported by one or more embodiments of the fiber channel verification system 302. When a new fiber network is to be designed, a user can interact with user interface component 304 to create a new fiber network project file. The user interface component 304 also renders an interactive design platform on the user's client device that allows the user to define the fiber optic network design in terms of the components (e.g., devices, cables, connectors, fiber optic cassettes, etc.) that make up the proposed fiber network and the interconnections between the components. The network design definitions can be saved to the project file, which can be shared among multiple users.

In general, fiber channel verification system 302 generates interface displays configured to receive component selection data 404 and component connectivity data 406 from a user via user interface component 304. Component selection data 404 identifies fiber network components that are to be included in the fiber optic network design. To facilitate selection of fiber network components to be included in the design, a component library 402 maintained on memory 320 stores component definition files 322 that define engineering specifications for a variety of fiber optic network components. Component definition files 322 can be classified in component library 402 according to component types, and user interface component 304 can generate interactive display objects that allow the user to browse and select from available network components (represented by component definition files 322) according to component type. Example component classifications can include, but are not limited to, trunk cables, patch cables, fiber optic cassettes, fiber optic connectors, cable assemblies (e.g., cables that are pre-terminated with connectors), or other such classifications.

In some embodiments, the fiber channel verification system 302 can update the component library 402 with new component definition files 322 when appropriate. For example, in embodiments in which fiber channel verification system 302 is a web-based system or has access to the Internet, the component data import component 316 can be configured to access one or more remote repositories in which new component definition files 322 are stored. Such remote sources may be, for examples, websites or web servers maintained by fiber component vendors, who may add component definition files 322 to their repositories corresponding to newly available networking components. In response to discovering that new component definition files 322 are available at a remote component repository, the component data import component 316 can retrieve and store the new component definition files 322 in the component library 402, thereby ensuring that the component library 402 reflects current product availability.

Figure 5:
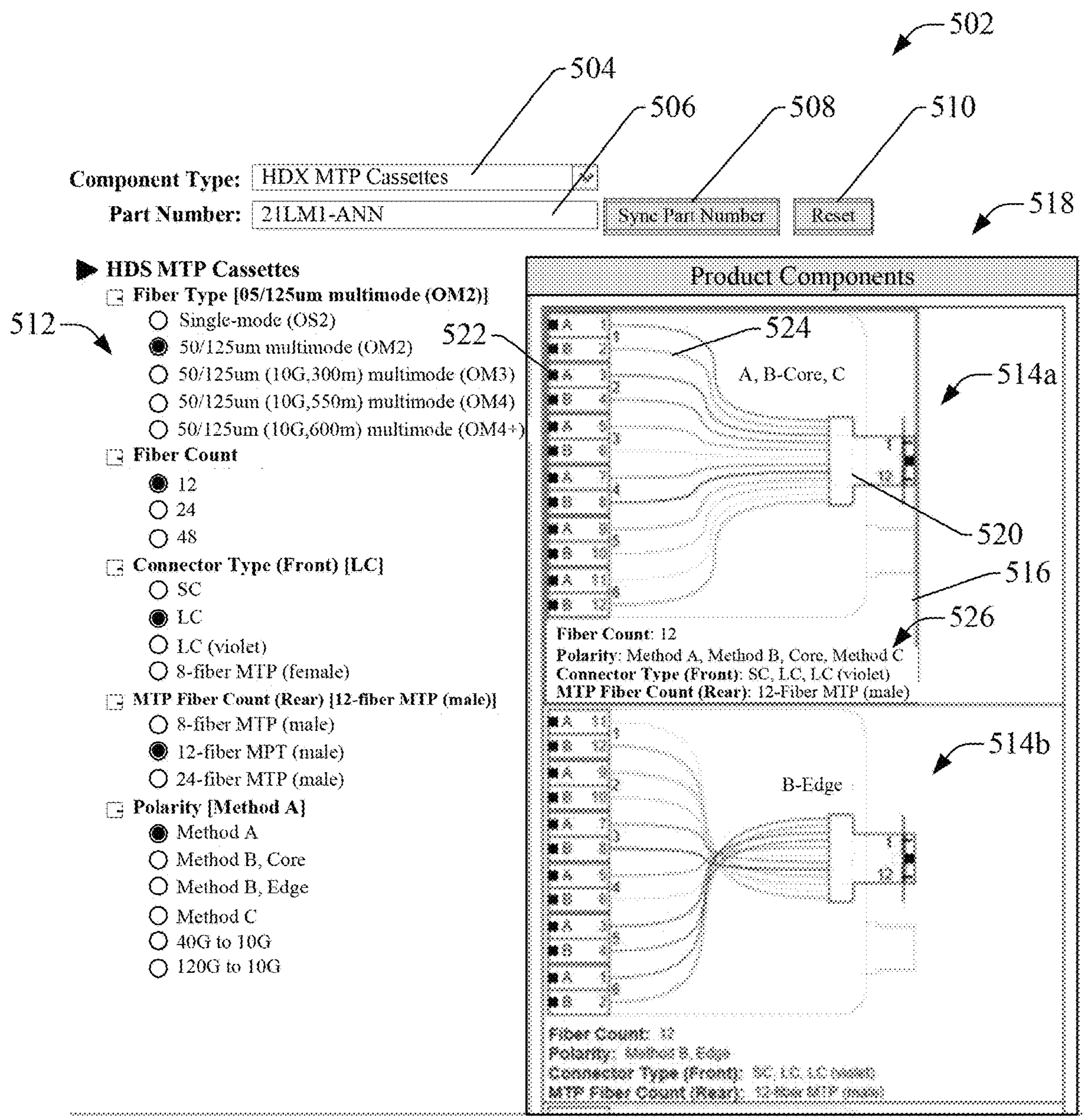
FIG. 5 is an example component selection screen that can be generated by a user interface component of the fiber channel verification system.

The design platform can allow the user to enter component selection criteria, and renders a subset of available components that satisfy the selection criteria. The user can then select a desired component from the rendered subset of components. FIG. 5 is an example component selection screen 502 that can be generated by user interface component 304 according to one or more embodiments. In this example, component selection screen 502 includes a Component Type drop-down selection box 504 that allows a user to select a category of components from a list of available component categories. The list of available component categories can be generated by user interface component 304 based on the categories represented by the component definition files 322. In the illustrated example, the user has selected high density (HDX) multi-fiber (MTP) fiber optic cassettes as the category of interest. Based on the category selected using drop-down selection box 504, a component specification area 512 renders various categories of component attributes associated with the selected component category. The user can enter further component specification information by selecting component options available under each attribute category. In the illustrated example, selection of HDX MTP Cassettes as the component category causes the component specification area 512 to render specification options for that category, including fiber type (e.g., single mode, OM2 multimode, OM3 multimode, etc.), fiber count (e.g., 12, 24, 48, etc.), connector type (e.g., SC, LC, 8-fiber MTP, etc.), rear MTP fiber count (e.g., 5-fiber MTP, 12-fiber MPT, 24-fiber MTP, etc.), and polarity (e.g., Method A, Method B Core, Method B Edge, Method C, 40G to 10G, 120G to 10G, etc.).

In the illustrated example, the specification options are rendered as selectable radio buttons (though other graphical objects for selecting component attributes are also within the scope of one or more embodiments). As a user selects attributes from the various component attribute categories, a component display area 518 renders the subset of available components that satisfy the component type specified by selection box 504 and the attributes selected by the user in the component specification area 512. As the user selects additional attributes in the component specification area 512, the number of available components that satisfy the selected attributes becomes smaller. In the example depicted in FIG. 5, two available components 514*a* and 514*b* are rendered in the component display area 518, with the component that satisfies the user-defined attribute requirements (component 514*a*) indicated with a colored highlight 516.

To assist a user in making a suitable component selection, each component 514 rendered in the component display area 518 can include a graphical representation of the component as well as engineering data 526 for the component. The user interface component 304 can retrieve the graphical representations and engineering data for each component from that component's corresponding component definition file 322. In the example depicted in FIG. 5, the rendered components 514*a* and 514*b* are fiber optic cassettes. Accordingly, each component 514 includes a graphical representation of the cassette depicting the general shape of the cassette, the front connectors 522 of the cassette, the rear connector 520 of the cassette (e.g., corresponding to adapters 126 of the example fiber optic cassettes 104 depicted in FIGS. 1 and 2), and the optical fibers 524 housed in the cassette that provide optical paths between the front connectors 522 and rear connector 520 (e.g., corresponding to rear connector 124 of example fiber optic cassettes 104 in FIGS. 1 and 2). The optical fibers 524 are shown as traces between the rear connector 520 and the front connectors 522. The engineering data 526 specifies the fiber count, polarity, front connector type, and rear connector type for each cassette. The user can select a desired component for inclusion in the fiber network design by selecting the component from the component display area 518 (e.g., using a mouse click action, a touch screen action, etc.).

In some embodiments, component selection screen 502 can also allow the user to enter an explicit part number in part search window 506 as an alternative to entering selection criteria for a desired fiber network component. Entering a part number in part search window 506 can cause the system 302 to located and render information for the entered part number in the component display area 518. Also, in some embodiments, the system 302 can allow the user to import a list of desired components to be included in the design from an external source. For example, the component data import component 316 may be configured to extract component part numbers from an imported spreadsheet, text document, comma separated values (CSV) file, or another document format. The fiber network building component 306 can then retrieve the component definition files 322 corresponding to the extracted part numbers and import those component definition files 322 into the pending design. This functionality allows the user to prepare a document (e.g., a spreadsheet, word processing document, CSV file, etc.) including a list of components to be included in the network design, and import the document into the system 302 in order to streamline the component selection process. Component selection screen 502 also includes a Reset button 510 that, when selected, clears the user-defined component type and attribute data.

It is to be appreciated that embodiments of the fiber channel verification system 302 described herein are not limited to the particular component selection screen 502 illustrated in FIG. 5, and that other techniques for browsing and selecting network components to be included in a fiber network design are within the scope of one or more embodiments of this disclosure.

Returning to FIG. 4, the user's fiber network component selections are entered as component selection data 404, and the component definitions corresponding to the selected network components are retrieved from the component library 402 as component definition data 408 and imported into the impending design project. Example network components represented by the component definition data 308 can include, but are not limited to, trunk cables, patch cables, fiber optic cassettes, optical fiber connectors (single fiber and multi-fiber connectors), network architecture devices (e.g., routers, hubs, switches, etc.) or other such devices. In addition to entering the component selection data 404 identifying the components to be included in the network design, the user can also specify desired connections between the selected components via interaction with the design platform interfaces. This connection information is entered as component connectivity data 406.

Figure 6:
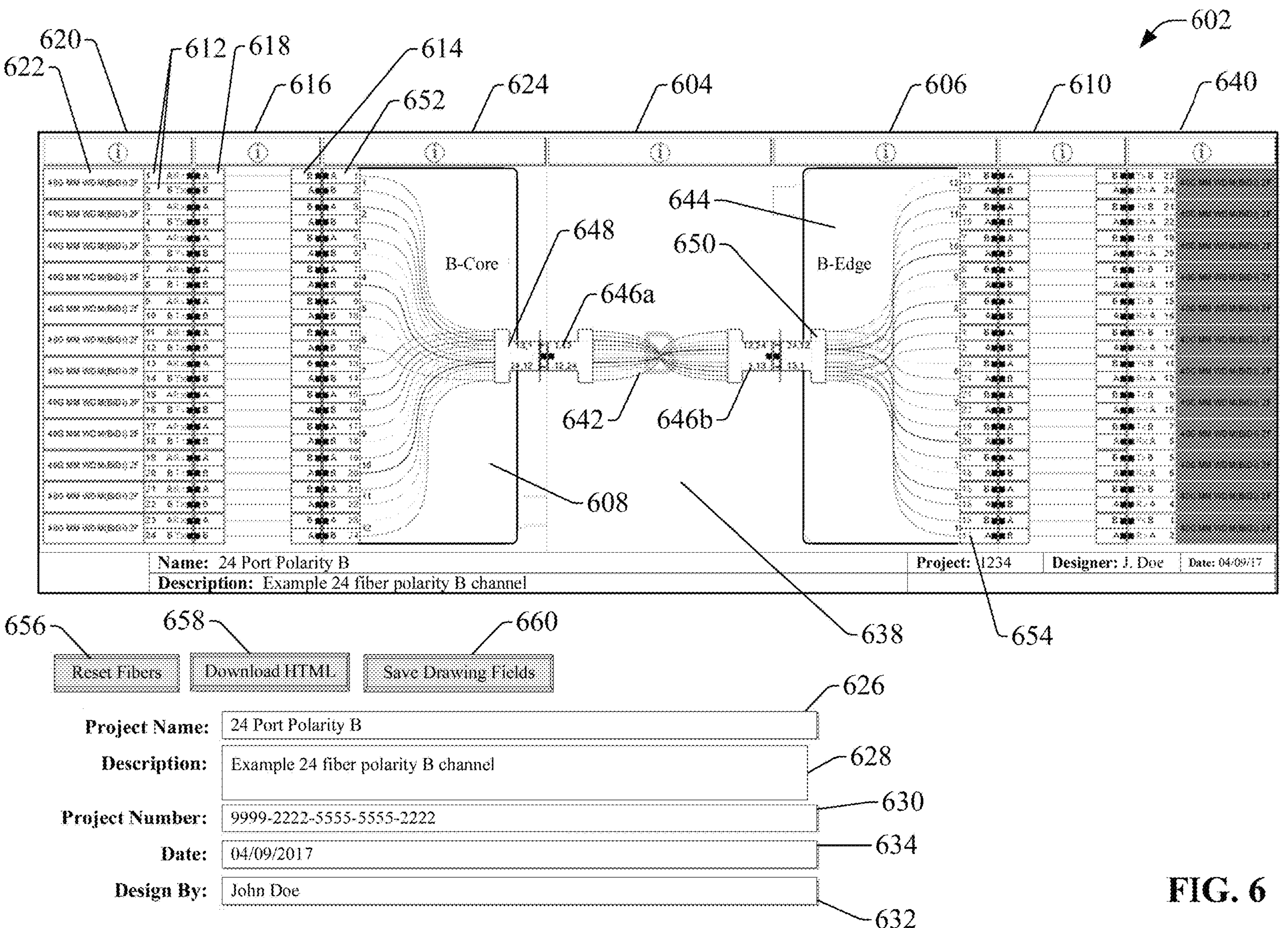
FIG. 6 is an example network design screen that can be generated by the user interface component of the fiber channel verification system.

FIG. 6 is an example network design screen 602 that can be generated by user interface component 304 (see FIG. 3) according to one or more embodiments. Through interaction with this network design screen 602, a user can define connections between the network components selected as described above in connection with FIG. 5. In general, the selection of network components (represented by component definition data 408 in FIG. 4) and the defined connections between the components (represented by component connectivity data 406 in FIG. 4) together define the fiber network design.

Network design screen 602 can include a number of fields for entering metadata to be associated with the current design project. In the illustrated embodiment, these fields include a Name field 626 for entering a name of the project, a Description field 628 for entering a description for the project, a Project Number field 630 for entering a project number, a Designer field 632 for entering a name of the network designer, and a Date field 634 for entering a date that the network design was conceived. Other metadata fields can also be included in some embodiments.

A network configuration area 638 of the network design screen 602 renders graphical representations of the network components selected by the user as described above in connection with FIG. 5. Through interaction with network design screen 602, the user can arrange the selected components to reflect the intended connections between the components. In the illustrated example, network design screen 602 comprises a set of columns 620, 616, 624, 604, 606, 610, and 640. The user can define network connections assigning selected network components to the respective columns. This yields a horizontal arrangement of components and a substantially horizontal depiction of data flow between data ports 622 of the fiber optic switches.

In the example depicted in FIG. 6, fiber optic switches have been assigned to the left-most column 620 and right-most column 640. Each fiber optic switch comprises multiple data ports 622 (e.g., corresponding to data ports 120*a*, 120*b* of FIG. 1), with each data port 622 comprising a pair of adapters 612 for data receipt (A, Rx) and data transmission (B, Tx). The fiber network being designed provides fiber channels (light paths) between respective data ports 622 of the two fiber optic switches. To this end, selected fiber network components can be assigned to the intermediate columns 616, 624, 604, 606, and 610 between the left-most column 620 and right-most column 640 to yield the desired fiber channels between the data ports 622.

In the example illustrated in FIG. 6, the middle column 604 has been designated for the trunk cable 642 that is to extend between the two enclosures housing the fiber optic switches assigned to columns 620 and 640. Accordingly, the user has assigned a selected type of trunk cable 642 to the middle column 604. The selected trunk cable 642 is a 24-fiber cross-over cable terminated on both ends by 24-fiber MTP female connectors 646*a* and 646*b*. When the user assigns a selected type of trunk cable to column 604, fiber network building component 306 (see FIG. 3) renders a graphical representation of the trunk cable in column 604.

In columns 624 and 606—the two columns adjacent to the middle column 604—the user has assigned selected fiber optic cassettes 608 and 644 (e.g., corresponding to cassettes 104*a*, 104*b* of FIG. 1). In particular, the user has assigned a 24-fiber cassette 508 having a method B-core polarity with a 24-fiber male rear connector 648 (e.g., corresponding to rear connector 124 of FIG. 1) to column 624, and a 24-fiber cassette 644 having method B-edge polarity and a 24-fiber male rear connector 650 to column 606. In some embodiments, if trunk cable 642 has been assigned to column 604 before fiber optic cassettes 608 and 644 have been selected, the fiber network building component 306 may filter the available fiber optic cassette selections such that only cassettes having complimentary fiber rear connector types can be selected for assignment to columns 624 and 606.

In response to assigning a fiber optic cassette 608, 644 (or other network component) to a column 624, 606 adjacent to a column 604 containing a trunk cable 642, the fiber network building component 306 orients the graphical representation of the fiber optic cassette on the network design screen 602 such that the rear connector 648, 650 of the fiber optic cassette 608, 644 interfaces with the adjacent connector 646*a*, 646*b*, of the trunk cable 642. The fiber network building component 306 also records these interfaces between connectors 648 and 646*a*, and between connectors 646*b* and 650, as part of the fiber network definition data 410 (see FIG. 4) for the network design project. In the illustrated example, the fiber network building component 306 has oriented each fiber optic cassette 608, 644 in its respective columns 624, 606 such that the front fiber adapters 652 and 654 (e.g., corresponding to adapters 126 of FIG. 1) of the cassettes 608, 644 face away from the trunk cable 642 and toward the opposing adjacent columns 616 and 610.

As the final connections between the fiber optic cassettes 608, 644 and the fiber optic switches assigned to columns 620 and 640, the user has assigned patch cables to columns 616 and 610. In this example, the user has selected duplex patch cables having fibers that are terminated on both ends by fiber connectors 618 and 614 (e.g., LC connectors). In some embodiments, if the fiber optic cassettes 608 and 644 are assigned to their respective columns 624 and 606 before patch cables have been selected for assignment to columns 616 and 610, the fiber network building component 206 may filter the available patch cable selections (that is, filter the component definition files 322 (see FIG. 3)) such that only patch cables having complimentary fiber counts and fiber connector types are rendered for browsing and selective assignment to columns 616 and 610.

Figure 7:
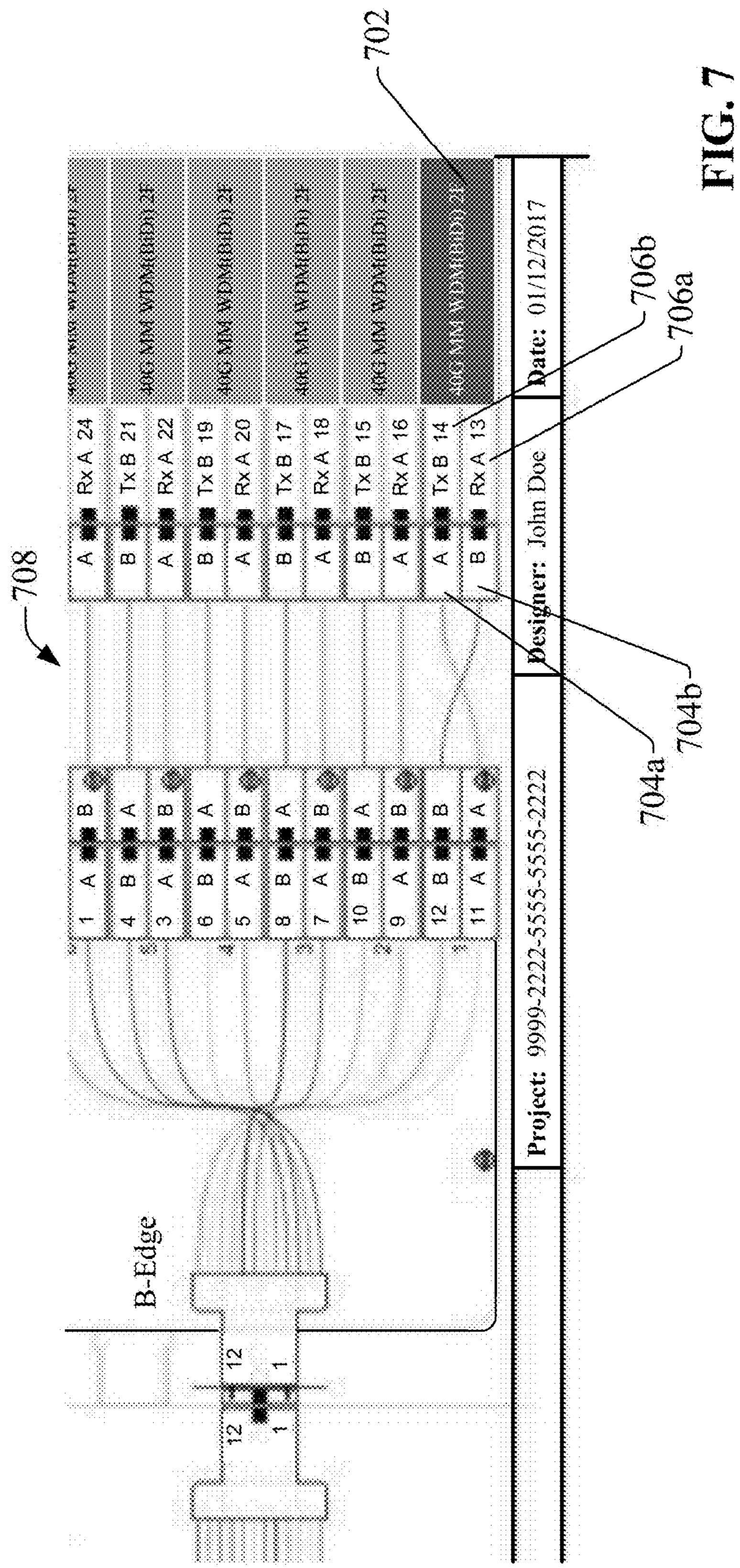
FIG. 7 is a close-up view of a portion of a network design screen generated by the user interface component of the fiber channel verification system.

When a patch cable is assigned to a column (e.g., column 616 or 610) adjacent to a column (e.g., column 624 or 606) to which a fiber optic cassette has been assigned, fiber network building component 306 can automatically match individual fiber connectors 614 to corresponding front adapters 652 of the cassette (where the fiber connectors 614 and front adapters 652 interface at the boundary between columns 616 and 624). The fiber network building component 306 can also automatically connect fiber connectors 618 on the opposite end of the patch cable's fibers to corresponding Rx or Tx adapters 612 of the fiber optic switches (where the fiber connectors 618 and adapters 612 interface at the boundary between columns 620 and 616). However, the user can alter any of these connections via interaction with network design screen 602 if desired. Turning briefly to FIG. 7, a close-up view of a portion of network design screen 602 is shown. In this example, a pair of optical fiber connectors 704*a*, 704*b* of a patch cable 708 have been assigned to a corresponding pair of adapters 706*a*, 706*b* of a data port of a fiber optic switch. The designer has reversed the pair of optical fiber connectors 704*a*, 704*b* such that the A connector 704*a* is connected to the B adapter 706*b* of the switch, and the B connector 704*b* is connected to the A adapter 706*a* of the switch. In some embodiments, this reversal can be achieved by selecting the desired optical fiber pair on the network design screen 602 (e.g., via a mouse click selection or touch screen selection) and entering a reversal command (e.g., by selecting the reversal command from a right-click pop-up menu), or by clicking and dragging the endpoints of the optical fibers to the desired connection points on the switch.

The fiber network analysis component 310 of fiber channel verification system 302 can dynamically verify component or fiber connections as the user adds components to the design and enters connectivity instructions. In the example depicted in FIG. 7, reversing the pair of connectors 704*a*, 704*b* relative to adapters 706*a*, 706*b* yields an improper connection between the adapters 706*a*, 706*b* and a device—e.g., another fiber optic switch—at the other end of the channel (not shown), or may result in in an invalid connection between Rx and Tx connectors. Accordingly, the fiber network analysis component 310 causes the switch data port indicator 702 corresponding to that data port to change visual state—e.g., by changing from green to red—to convey the improper connection to the user. In an example embodiment, a switch data port indicator 702 may be colored green if a proper connection to the data port is identified, red if an improper connection is identified, or white if no connection to the data port 706 is identified. Techniques supported by the fiber channel verification system 302 for verifying connections defined by the user will be described in more detail below.

The example design project depicted in FIG. 6 includes a single trunk cable 542 connecting two fiber optic cassettes 608 and 644, which are each connected to a single fiber optic switch via patch cables. However, other network configurations can also be designed using network design screen 602. For example, network design screen 602 may be used to design a network having two trunk cables (or a multi-leg trunk cable), with each trunk cable connecting a pair of fiber optic cassettes. In such network configurations, both trunk cables can be assigned to the middle column 604, and two fiber optic cassettes can be assigned to each of columns 624 and 606.

In the illustrated example, a Reset Fibers button 656 is included that, when selected, resets the network design screen 602 by clearing the fiber components and connections from the screen. A Download HTML button 658 creates a web-compatible graphical file of the fiber optic network design (e.g., in HTML format). A Save Drawing Fields button 660 can cause the information entered into the Project Name field 626, the Description field 628, the Project Number field 630, the Date field 634, and the Designer field 632 to be saved to the design project.

In the examples described above, the fiber channel verification system 302 allows the user to explicitly select components for inclusion in the optical network, and to arrange the components as necessary among the columns of network design screen 602. In some embodiments, the fiber channel verification system 302 can also allow the user to enter design or network application requirements (e.g., via a design wizard or other such tool) and the fiber network building component 306 can automatically select and assemble network components—e.g., cables, cassettes, switches, intermediate network devices, etc. —that will satisfy the defined requirements. In an example scenario, the fiber channel verification system 302 may generate screens or windows that prompt the user to enter information identifying the end devices to be networked together, as well as the distance between the devices, the number of data ports to be connected, or other such application information. Based on these application specifications, the fiber network building component 306 can select suitable components for connecting the devices—including specifying trunk and patch cables of suitable lengths for covering the distances between the devices—and define appropriate connections between the components.

Figure 8:
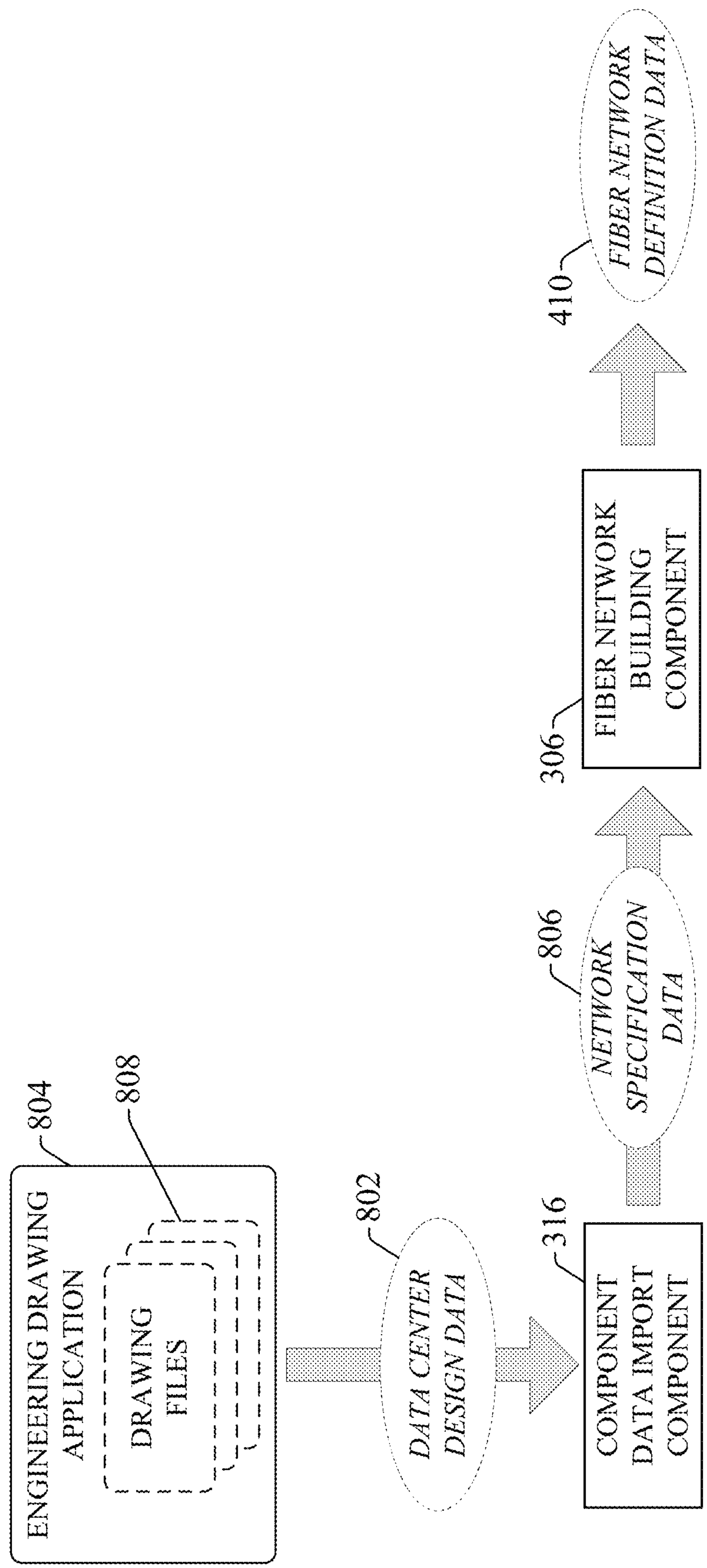
FIG. 8 is a diagram illustrating generation of fiber network definition data based on design parameters imported from an engineering drawing application into the fiber channel verification system.

In a related feature, some or all of the application specification information can be imported from external programs rather than being entered manually by the user. For example, information specifying design parameters of a network to be built can be imported from an engineering drawing application (e.g., AutoCAD or another drawing application). FIG. 8 is a diagram illustrating generation of fiber network definition data 410 based on design parameters imported from an engineering drawing application 804. In this example, a designer has created one or more drawing files 808 depicting a data center design using engineering drawing application 804. The data center design defines an arrangement of transceivers which may be installed in respective enclosures. Each transceiver may be mounted on a rack, tray, or panel within its enclosure. The drawing files 808 may include drawings of the structural components of a data center, including information identifying the enclosures, racks, trays, panels, etc. within which the transceivers are installed. These drawings may also include the dimensions and relative locations of these structural components, which can be used by the fiber network building component 306 to select cables and cassettes for networking the transceivers. The drawing files 808 may also include higher level drawings illustrating the distances between the cabinets containing the transceivers, which can be used by the fiber network building component 306 to specify trunk cable lengths.

This drawing file information can be imported into the fiber channel verification system 302 as data center design data 802 by component data import component 316, which generates network specification data 806 based on an analysis of the data center design data 802. The network specification data 806 can include, for example, distances between transceivers to be networked, types of mounting available within each enclosure (e.g., rack, tray, panel, etc.) as well as available space within each enclosure for mounting networking components, and other such information. The network specification data 806 obtained by the component data import component 316 can be provided to the fiber network building component 306, which can generate a network design based on this specification data 806. For example, if the network specification data 806 indicates that a transceiver is located in an enclosure with available space on an existing fiber optic cassette tray, the fiber network building component 306 may select a fiber optic cassette having a suitable fiber count to be mounted at the available space, and may further select a patch cable having a suitable length (determined based on the dimensions of the enclosure and the determined distance between the tray and the transceiver) for connecting the transceiver to the cassette. The fiber network building component 306 can also select a trunk cable having a suitable length for connecting two enclosures based on the distances between the enclosures as specified by the network specification data 806.

Returning to FIG. 4, after the component selection data 404 and the component connectivity data 406 (collectively referred to as the network design information) have been entered by the user according to any of the techniques described above, the fiber network building component 306 (see FIG. 3) generates fiber network definition data 410 based on the network design information. Fiber network definition data 410 can be, for example, a project file that encodes the fiber optic network design in a format capable of being analyzed by fiber network analysis component 308. Once the fiber network definition data 410 has been generated—either after the design is complete or as the design is being defined by the user—the fiber network analysis component 308 can analyze the fiber network definition data 410 to verify that all fiber network channels defined as part of the design are valid (e.g., that polarities are correct, that specified connections between data ports and/or devices compatible, etc.). The fiber network analysis component 308 can also estimate various metrics for the network design, including but not limited to insertion loss and return loss. Based on this analysis, the fiber network analysis component 308 can generate fiber network analysis results 412, which are rendered to the user via user interface component 304.

Figure 9:
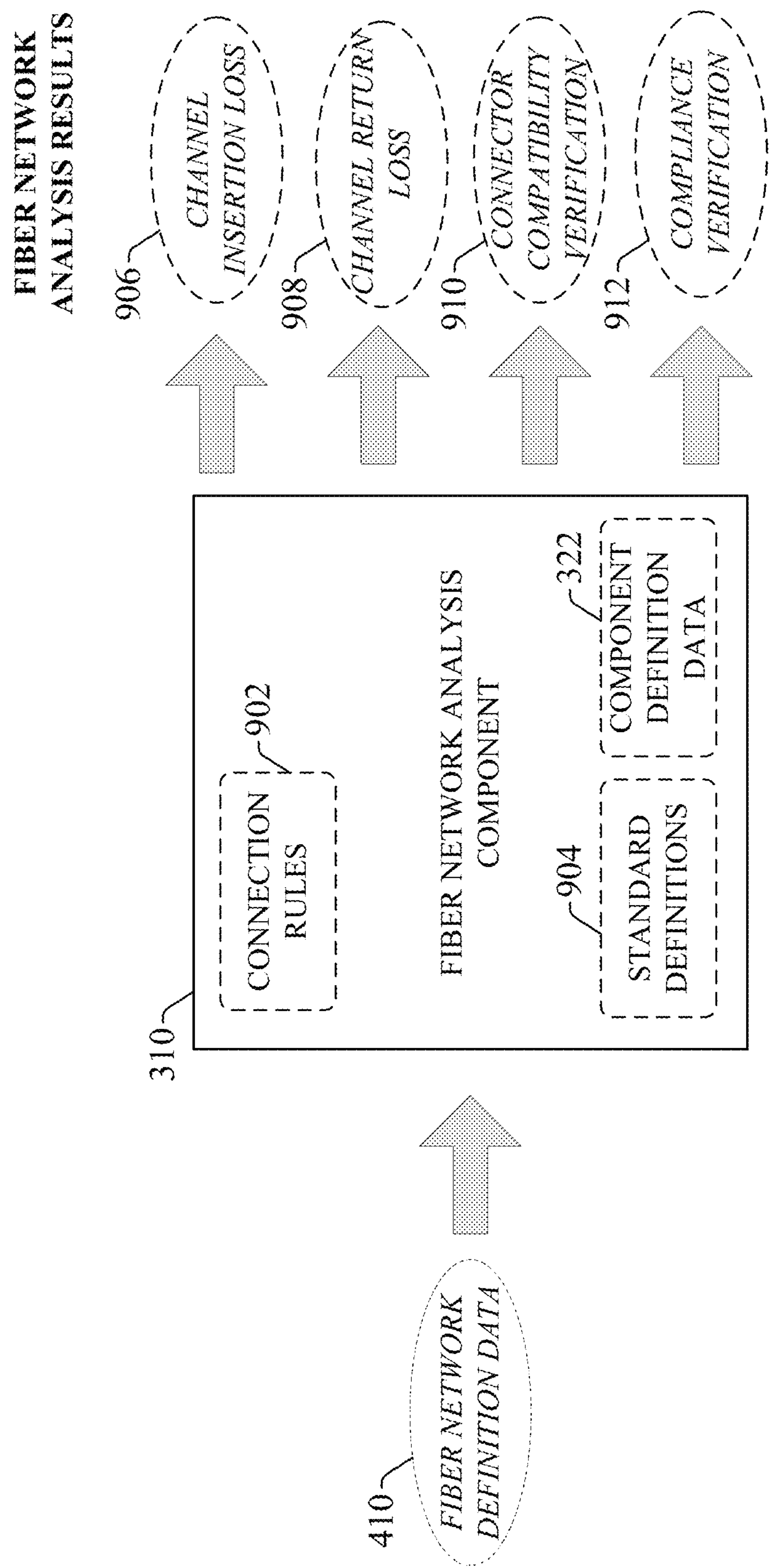
FIG. 9 is a diagram illustrating example fiber network analysis results that can be generated by a fiber network analysis component based on analysis of fiber network definition data.

FIG. 9 is a diagram illustrating example fiber network analysis results that can be generated by the fiber network analysis component 308 based on analysis of fiber network definition data 410 as shown in FIG. 4. As noted above, fiber network definition data 410 is generated by fiber network building component 306 based on the network component selections and connectivity information input by the user. Once the user has completed the network design, fiber network analysis component 310 can analyze the resulting fiber network definition data 410 to verify that all component connections and channel paths are valid, and to estimate various performance metrics for the network.

For example, in some embodiments, fiber network analysis component 310 can estimate an insertion loss 906—or loss of optical signal power as a result of network components within the channel path—for each channel of the proposed network. Fiber network analysis component 310 can also estimate a total return loss 908—or loss of signal as a result of reflection of incident light signal by components within the channel path—for each channel. To determine these estimates, fiber network analysis component 310 can reference estimated loss information stored in the component definition file 322 for each selected component and generate the insertion loss estimates 906 and return loss estimates 908 based on this loss information (e.g., by totally the estimated insertion or return loss estimates for each component that makes up the channel).

Fiber network analysis component 310 can also compare the estimated insertion loss and return loss for each channel with defined maximum allowable insertion and return loss values, and generate a notification on network design screen 602 (see FIG. 6) in response to determining that the insertion or return loss for a given channel exceeds the defined maximums. For example, user interface component 304 (see FIG. 3) may highlight a channel having an estimated insertion or return loss that exceeds a defined maximum loss, and render a text message indicating that the insertion or return loss for the identified channel is excessive. In some embodiments, in response to determining that the insertion or return loss for a channel exceeds the defined maximum, the fiber network analysis component 310 may also generate and render a recommendation for a network modification that will reduce the estimated loss for the channel. For example, the fiber network analysis component 310 may identify one or more components or devices within the channel that can be replaced with other similar components having lower associated insertion losses. Fiber network analysis component 310 can make this determination by searching the component definition files 322 for equivalent components, referencing the theoretical insertion losses defined for these equivalent components, and comparing these theoretical insertion losses with those of the components to be replaced. The fiber network analysis component 310 may also identify trunk or patch cables defined in the design having excessive lengths, and recommend replacing these cables with shorter equivalent cables in order to reduce signal degradation.

Fiber network analysis component 310 can also verify that each component and fiber connection defined within the fiber system definition data is valid, and generate connector compatibility verification data 910 based on this assessment. For example, for each channel, the fiber network analysis component 310 can determine the two endpoints of the channel, identify the devices and/or data ports at each of the two endpoints, and identify whether a communicative connection between the devices and/or data ports is valid. This can include, for example, determining whether a receive port (e.g., a receive port of a first fiber optic switch) on one end of the channel connects to a transmit port on the opposite end of the channel. If the fiber network analysis component 310 determines that both ends of a channel are connected to data ports of the same data direction (e.g., two receive ports or two transmit ports are connected together), the fiber network analysis component 310 can identify this improper connection and render an indication on network design screen 602 identifying this improper connection. For example, the user interface component 304 may change the color of the two improperly connected data ports (e.g., to red, indicating an invalid connection), and render a text message indicating that the two indicated data ports are improperly connected together. In some embodiments, the user interface component may also highlight the optical fibers that make up the data channel between the two data ports, which may assist the user in identifying an improper splice or cross-connection within the channel that resulted in the improper connection. The fiber network analysis component 310 can verify that network components between the two endpoints are properly connected from a polarity standpoint. This can include, for example, verifying the polarity of a tap port of an optical splitter.

In addition to checking the polarity of the connections for each channel, some embodiments of the fiber network analysis component 310 may also determine whether two incompatible network components are connected together by a channel. This determination can be based on device compatibility information recorded in the component definition files 322. For example, a component definition file 322 for a given network component may include compatibility information identifying other components or classes of components that are incompatible with the network component. Accordingly, the fiber network analysis component 310 can use this information to determine whether two devices at respective two endpoints of a given channel are incompatible, and render a notification on network design screen 602 in response to detecting such an incompatibility.

Fiber network analysis component 310 may also verify that the physical connections defined by the user are valid. For example, for each fiber connection between two components of a channel, the fiber network analysis component 310 can verify that the type and gender of an output connector of one of the components is compatible with the type and gender of an input connector of the other component, and generate a notification if the input and output connectors are not compatible. If a connector incompatibility is identified, the fiber network analysis component 310 can recommend an alternative component that can be used as a replacement for one of the two components that will mitigate the connector incompatibility. The fiber network analysis component 310 can identify such a replacement component by searching the component definition files 322 for components that are functionally equivalent to the component being replaced, and identifying one of the equivalent component having a connector type that mitigates the connector mismatch. Similarly, the fiber network analysis component 310 can also verify that the key up or key down positions of the output connector of one component matches the key up or key down position of the input connector of the adjacent component, and generate a notification (and possibly a recommended replacement component or a reconfiguration recommendation) in response to identifying a mismatch.

In some embodiments, fiber network analysis component 310 can also be configured to verify that all connections of the proposed network design comply with one or more industry standards or in-house connection requirements, and generate compliance verification data 912 based on this analysis. To this end, the fiber channel verification system 302 can maintain standards definition data 904 and connection rule data 902 that can be referenced by the fiber network analysis component 310 in connection with verifying compliance of the design. For example, a connection rule or industry standard may require that fibers having different core, cladding, and/or coating diameters are not combined within the same channel. An example of such a rule may dictate that 15/125 micron fibers, 62.5/125 micron fibers, and 9/125 micron fibers should not be used in the same network channel. Accordingly, fiber network analysis component 310 can analyze the fiber specifications of the selected trunk cables, patch cables, and fiber optic cassettes included in the proposed design (by referencing the component definition files 322 for the selected cables) and generate a notification in response to determining that the use of one or more of these cables will violate this fiber diameter rule. If a violation is detected, the fiber network analysis component 310 can identify one or more components (e.g., patch cables, trunk cables, fiber optic cassettes, etc.) that can be replaced with an otherwise equivalent component having a fiber diameter that will mitigate the diameter mismatch.

In another example, if the facility in which the fiber optic network is to be installed has standardized on a particular type of connector or networking component, a connection rule 902 may be defined specifying that only connector types and components that are included on the list of standardized connector types or components may be used in a network design. Accordingly, the fiber network analysis component 310 can generate a notification if any non-approved connector types or components are discovered in the design. Alternatively, in some embodiments, user interface component 304 may preemptively limit available component selections to those approved components or classes of components defined by connection rules 902.

The various analyses and notifications described above can be performed on the fiber network definition data 410 dynamically as the user is entering the network component selections and defining the connections between the components. In this way, the fiber channel verification system 302 (see FIG. 3) will dynamically notify the user of improper fiber connections, component mismatches, or excessive signal losses as they are detected before other design choices are made. This can ensure that subsequent component selections or connections are not made on the basis of an improper network component or connection. Alternatively, some embodiments can allow the analyses carried out by the fiber network analysis component 310 to be deferred until after completion of the design.

After completion of the design, the fiber channel verification system 302 can allow the user to test alternative design scenarios by performing a test substitution of one or more selected network components. For example, the user may wish to compare total insertion losses for a channel when different model numbers of a given network component are used. Accordingly, in an example scenario, the user can select the component on the network design screen 602 to be substituted, and indicate that a test replacement is to be performed on the selected component. To assist the user in selecting a substitute component, the fiber network building component 306 (see FIG. 3) can identify the subset of component definition files 322 corresponding to components that are functional equivalents to the selected components, and present this filtered subset of components to the user for selection. The filtered subset of components can be rendered as a list identifying the component names and relevant engineering specifications for each component. In response to selection of a desired substitute component from the subset, the fiber network building component 306 will run a test analysis whereby the original component is replaced with the selected substitute component, and the resulting modified design is analyzed for insertion or return losses or other metrics. The user can then instruct the fiber channel verification system either to keep the modified design as the final design, or to revert to the original design. In this way, the user can compare various what-if design scenarios before opting for a finalized version of the design.

Figure 10:
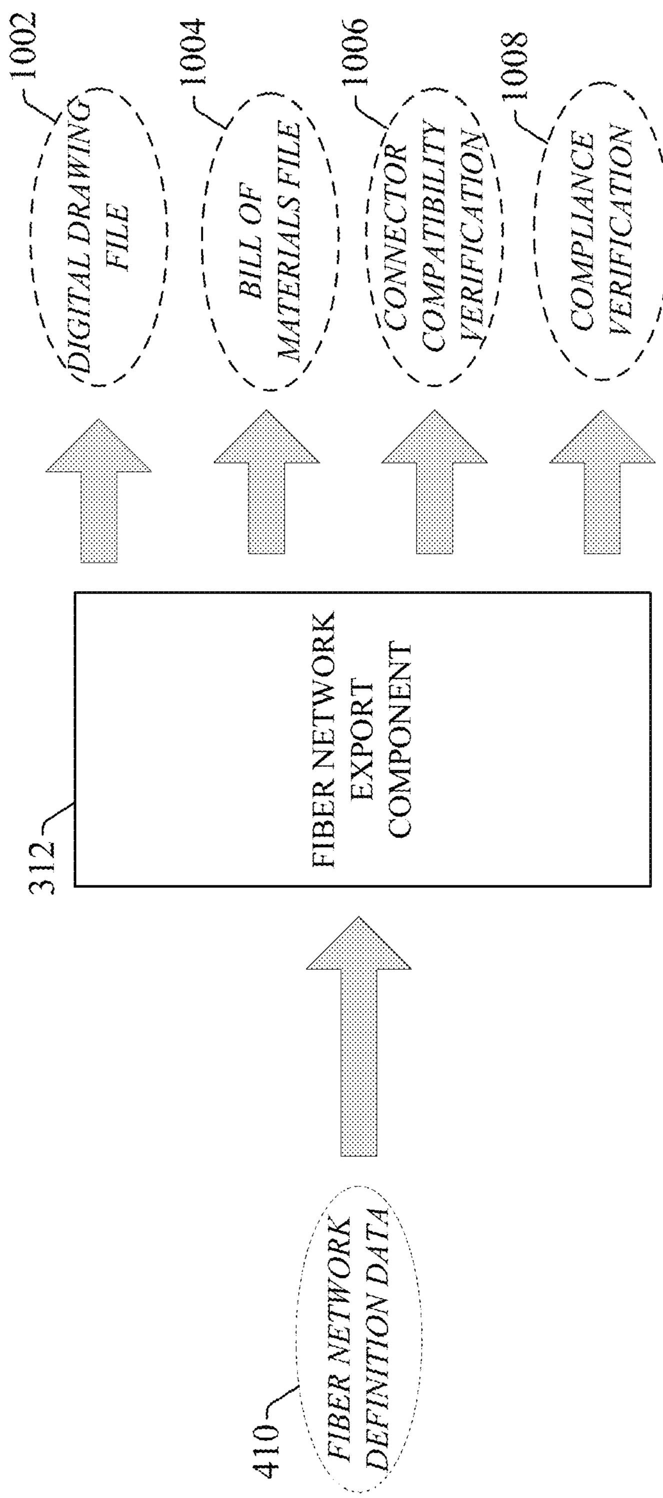
FIG. 10 is a diagram illustrating conversion of fiber system definition data to various formats by a fiber network export component of the fiber channel verification system.

Once the network design has been completed and the fiber network analysis component 310 verifies that there are no errors in the design (e.g., all channel paths are valid, all network components are compatible with their mating components, signal losses for each channel are within acceptable tolerances, etc.) the completed design can be exported in a selected one of several supported formats. FIG. 10 is a diagram illustrating conversion of the completed and verified fiber network definition data 410 to various formats by the fiber network export component 312. The user can select to export the verified design as a digital drawing file, such as an AutoCAD file, a PDF file, or other format. The digital drawing file 1002 can render the network in a similar format to that shown on the network design screen 602. In some embodiments, the digital drawing file 1002 can be generated as an editable file, allowing other users to implement and save design modifications directly on the drawing file 1002. The design can also be exported in a format that can be published on a website (e.g., as an HTML file).

The fiber network export component 312 can also extract from the fiber network definition data 410 the list of networking components used in the design and generate a bill of materials file 1004 listing the components. The bill of materials file 1004 can be generated in a selected format including but not limited to a PDF file, a word processing file, a spreadsheet file, etc. FIG. 11 is a section of an example bill of materials document 1102 that can be generated by fiber network export component 312 (see FIG. 3) based on the fiber network definition data 410. This example bill of materials document includes a part number column 1104 listing the part numbers of each component used in the network design, a description column 1106 including description information for each component, and a quantity column 1108 conveying the number of each component required for the design. Other formats for the bill of materials file are also within the scope of one or more embodiments of this disclosure.

Returning now to FIG. 10, some embodiments of the fiber network export component 312 can also export analysis result data for the proposed network design. This can include connector compatibility verification report data 1006 identifying each component connection within the design and indicating whether the connection is valid or invalid. The analysis result data can also include compliance verification report data 1008 that lists the industry standards or in-house network connection rules (defined by the standards definition data 904 and connection rules data 902 (see FIG. 9)), and indicates for each rule whether the network design complies with that rule. These report documents can be saved as part of a document trail to prove compliance with industry or in-house standards.

Figure 12:
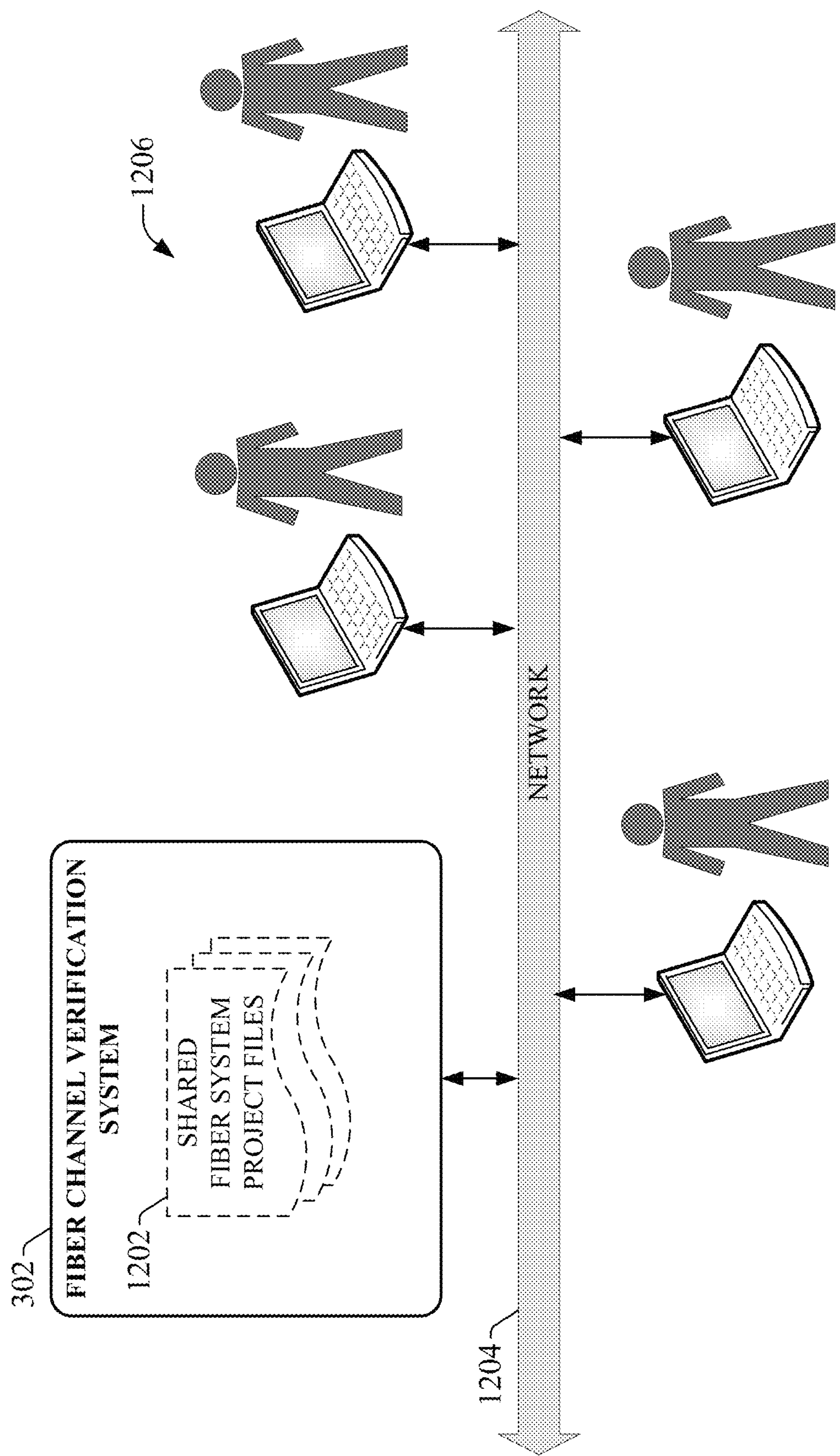
FIG. 12 is a diagram illustrating a general architecture in which the fiber channel verification system is installed on a local network.

In some implementations, the fiber channel verification system 302 (see FIG. 3) can be installed locally on a client device for use by an owner of the client device. In other implementations, the fiber channel verification system 302 can be installed on a central server or web server for shared access by multiple users. FIG. 12 is a diagram illustrating a general architecture in which the fiber channel verification system 302 is installed on a local network 1204 (e.g., ethernet network, a wireless network, etc.). Client devices 1206 associated with users having appropriate access privileges can access the system 302 over the network 1204 to create and verify fiber optic network designs. The fiber channel verification system 302 allows fiber network designs to be stored as shared fiber system project files 1202, which can be viewed and modified by multiple users having access rights to the shared project files 1202.

Figure 13:
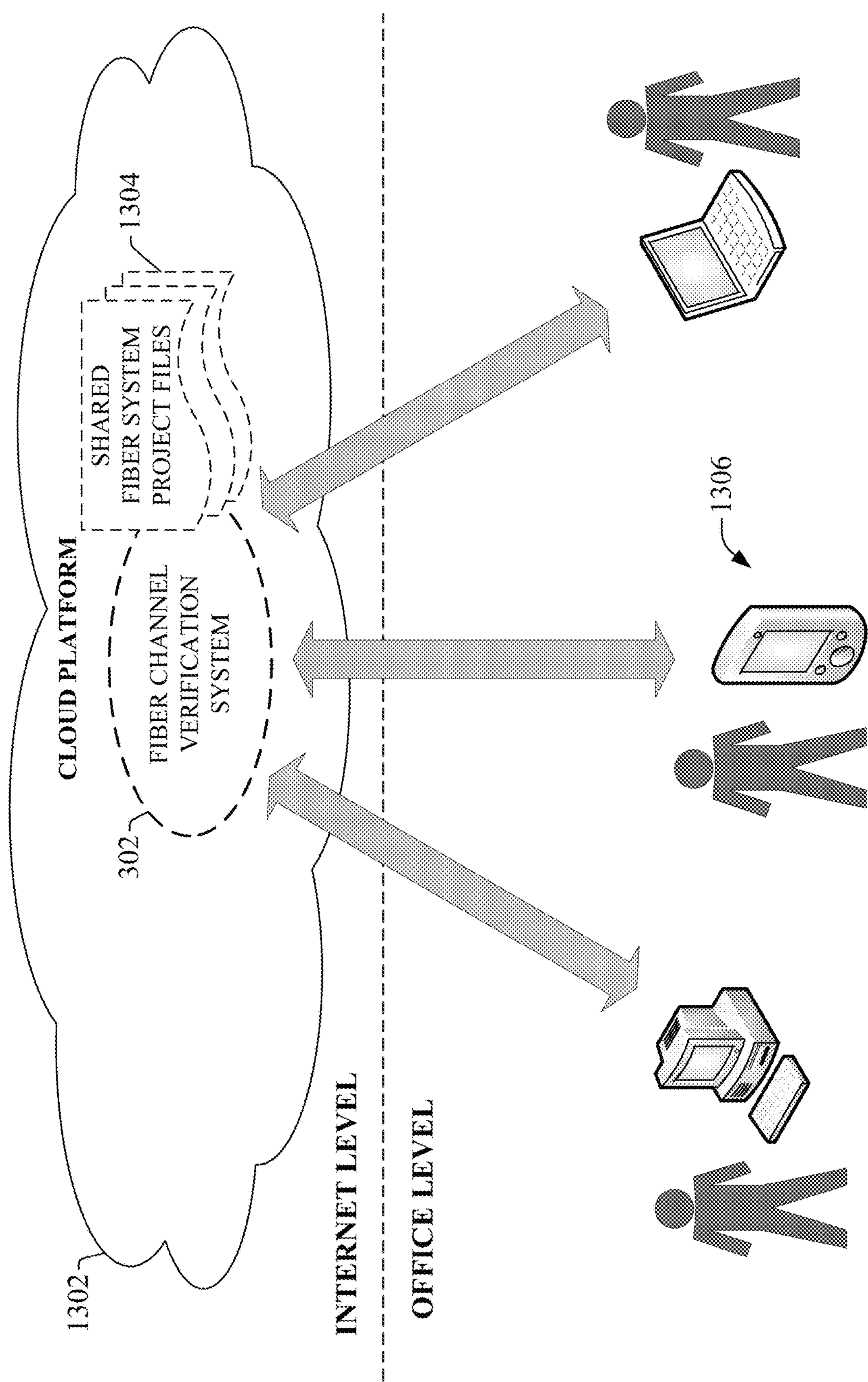
FIG. 13 is a diagram of an example implementation in which the fiber channel verification system executes as a cloud-based service on a cloud platform that can be accessed remotely by client devices associated with authorized users.

FIG. 13 is a diagram of another example implementation in which fiber channel verification system 302 (see FIG. 3) executes as a cloud-based service on a cloud platform 1302 that can be accessed remotely by client devices 1306 associated with authorized users. Cloud platform 1302 may be a public cloud accessible by client devices 1306 via an Internet connection, or may be a private cloud made up of multiple on-premise web servers. Similar to the network implementation discussed above in connection with FIG. 12, cloud-based fiber channel verification system 302 can store fiber network design project as shared fiber system project files 1304, which can be remotely accessed, viewed, and edited using client devices 1306. In either the local network implementation depicted in FIG. 12 or the cloud-based implementation depicted in FIG. 13, the fiber channel verification system 302 provides a central, common design platform that allows multiple members of a design team to view, edit, and share fiber network design files.

Figure 14:
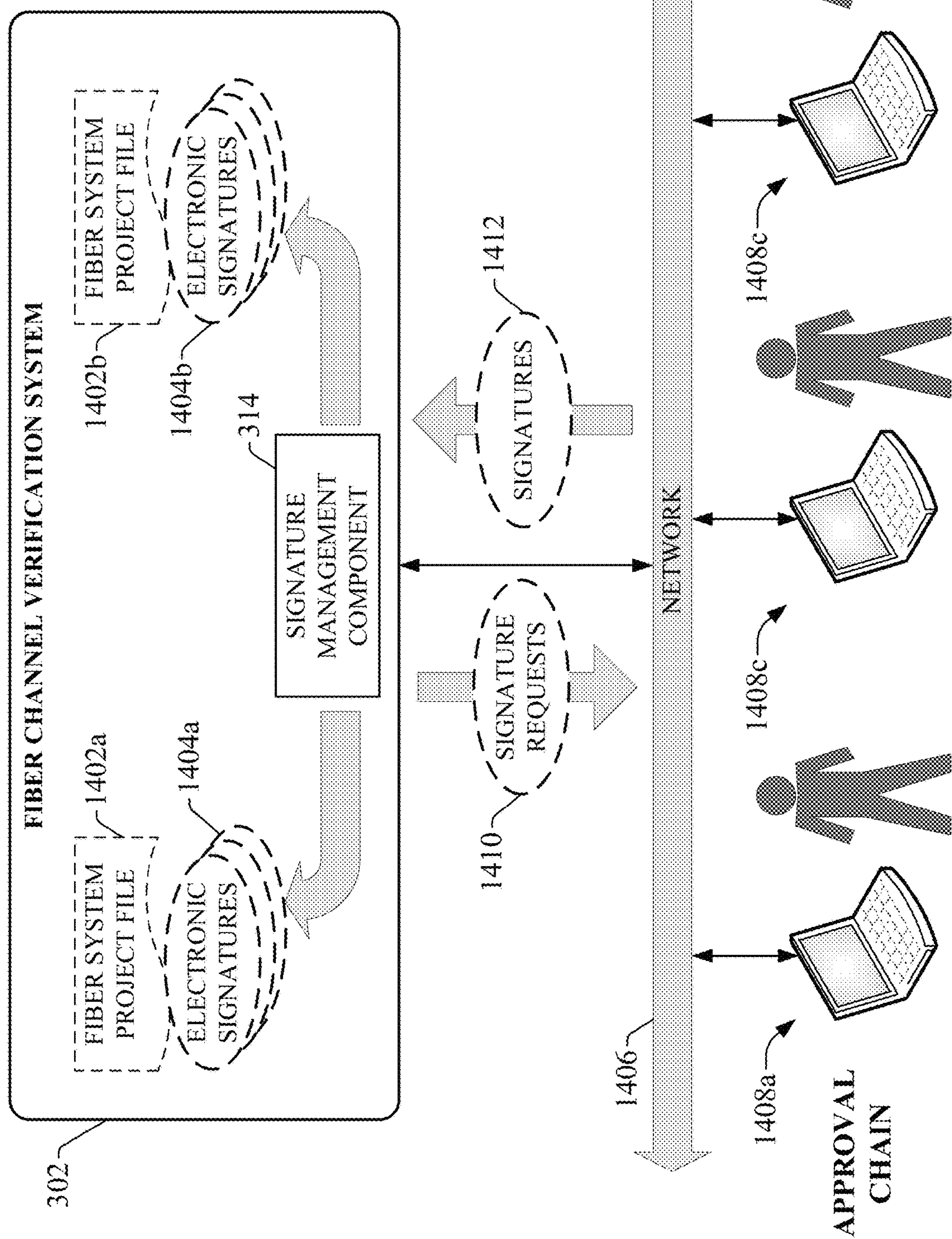
FIG. 14 is a diagram illustrating collection and management of electronic signatures for fiber network design projects by the fiber channel verification system.

In some embodiments, fiber channel verification system 302 can also include tools for collecting and managing electronic signatures to be used as approvals for a fiber network design. FIG. 14 is a diagram illustrating collection and management of electronic signatures for fiber network design projects. Signature management component 314 can manage collection of electronic signatures for respective different network design projects. In the illustrated example, two fiber system project files 1402*a* and 1402*b* have been created using techniques described above based on two different network designs that have been verified by fiber network analysis component 310. The two design projects represented by project files 1402*a* and 1402*b* are to be approved by specified users in an approval chain. The set of users who are assigned to approve the projects may be the same for both projects, or may be two different sets of users (e.g., a set of managers responsible for a work area to which the network design pertains). The identities and contact information (e.g., email addresses) of the users who are to approve a given project—referred to as the approval chain—can be entered for a given project via user interface component 304.

When a fiber system project file 1402*a* or 1402*b* have been completed and verified by fiber network analysis component 310, a designer can select a control associated with the project file that begins the process of electronic signature collection. In connection with this process, signature management component 314 can send signature request data 1410 to each user in the defined approval chain. The signature request data 1410 can be directed to the contact information (e.g., an email address, a mobile device identifier, etc.) defined for each user in the approval chain so that the request can be viewed on the recipients' client devices 1408.

The signature request data 1410 can include a file that renders the network design on the recipient's client device 1408, thereby allowing the recipient to review the fiber network design prior to approval. The rendered design can include a drawing of the proposed design (e.g., substantially conforming to the format depicted in FIG. 6), as well as a bill of materials identifying the part numbers and quantities of each component required for the design. The signature request data 1410 can also render an interactive control (e.g., a graphical button or other selectable indicator) that allows the user to electronically sign off on the proposed design, thereby generating an electronic signature indicating the recipient's approval.

As each user in the approval chain approves the design by generating an electronic signature, the electronic signatures 1412 are returned to the fiber channel verification system 302 (e.g., via email or another electronic communication method). The signature management component 314 associates the received electronic signatures 1404*a*, 1404*b* with their associated fiber system project file 1402*a*, 1402*b*. In this way, embodiments of the fiber channel verification system 302 can track the approvals of users in an approval chain for each design project. Signature management component 314 can also generate approval reports based on the collected electronic signatures 1412, identifying the users who have approved the design.

The fiber channel verification system 302 described herein can verify that the specified components and channel connections of a proposed fiber optic network design are free of connection errors, improperly routed channels, and excessive signal loss prior to purchasing and assembling the networking components. By automatically verifying component compatibility, checking connection integrity, and estimating signal degradation across each channel of the proposed design, the fiber channel verification system 302 can reduce total design time and improved quality of the final design. By allowing a designer to mock up and verify the proposed design prior to purchasing and assembling network components, the fiber channel verification system 302 can mitigate scenarios in which an improperly specified network component is purchased before discovering that the component is incompatible with other elements of the design, or results in violation of an industry or in-house design standard.

Figure 15:
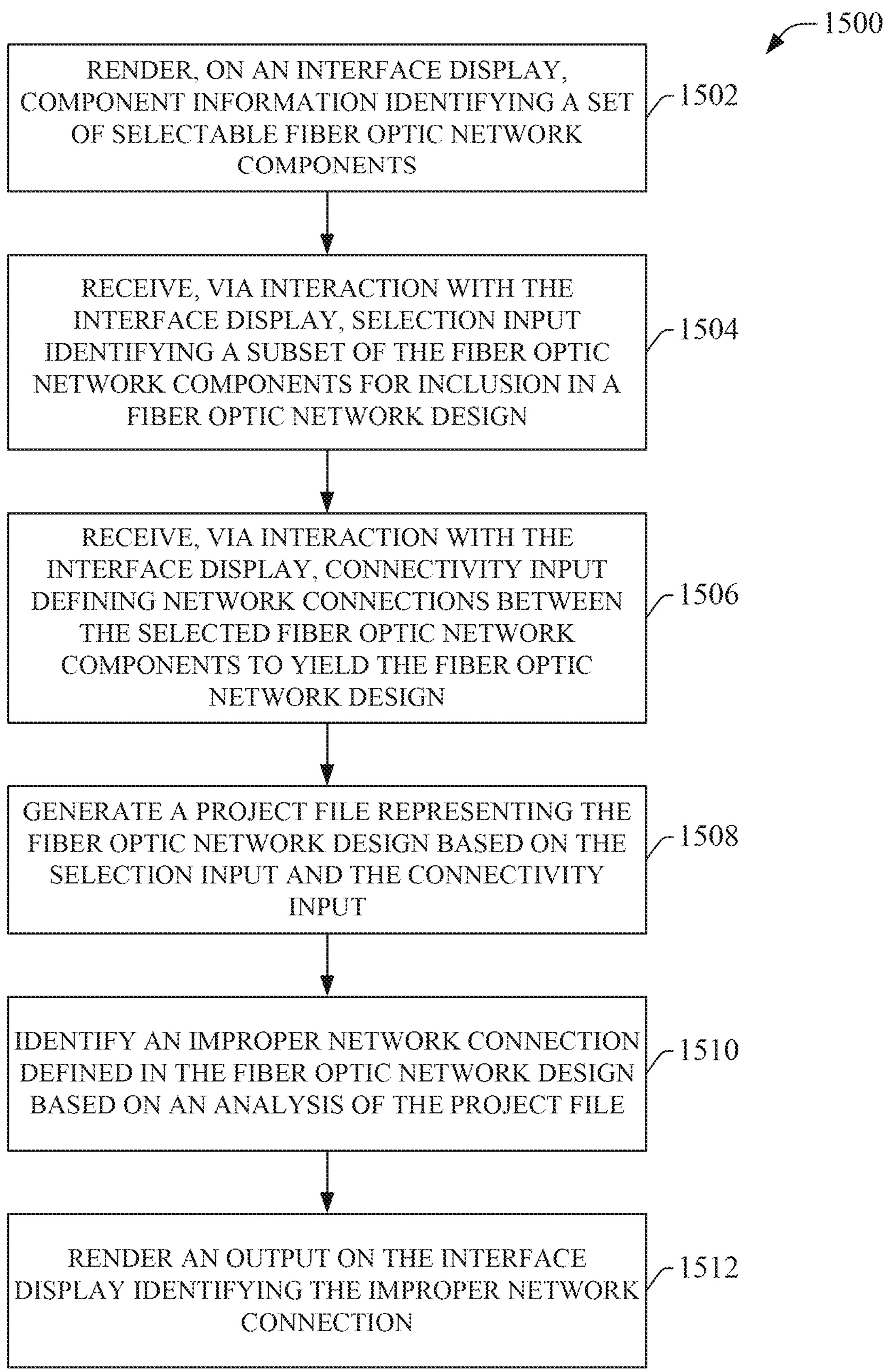
FIG. 15 is a flowchart of an example methodology for verifying channel connectivity of a proposed fiber optic network design.
Figure 16:
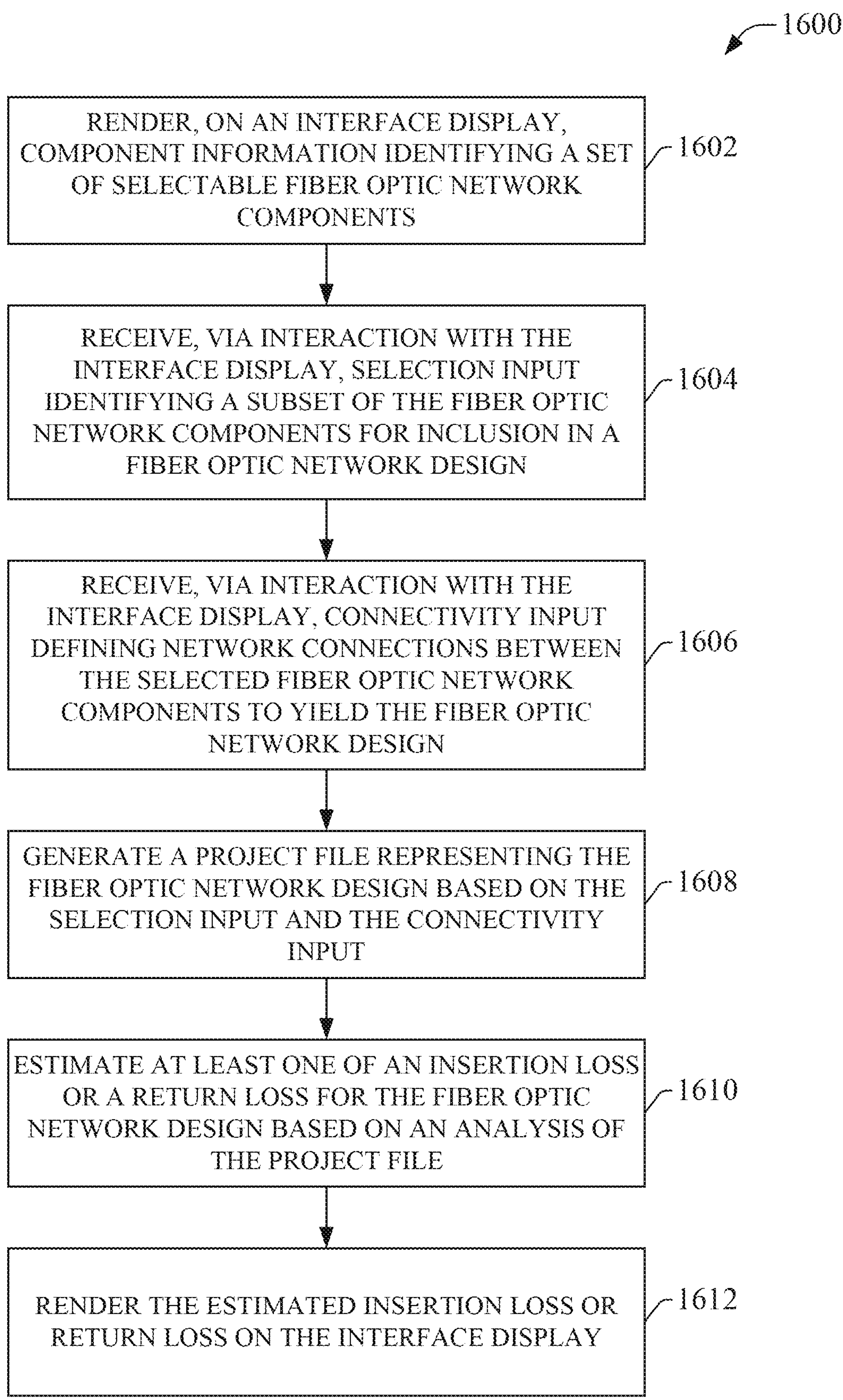
FIG. 16 is a flowchart of an example methodology for estimating an insertion loss or a return loss for a proposed fiber optic network design.
Figure 17:
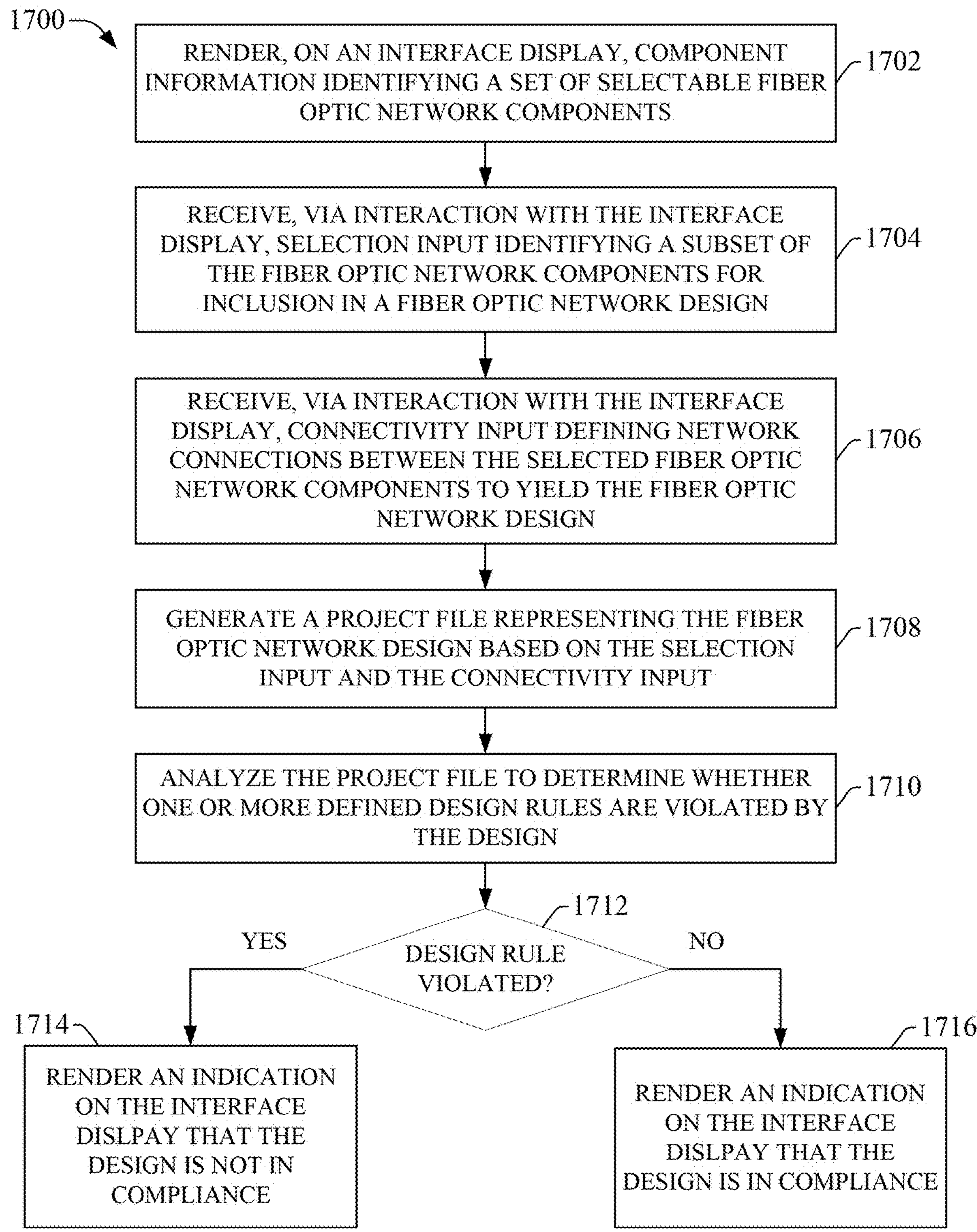
FIG. 17 is a flowchart of an example methodology for verifying that a proposed fiber optic network design is in compliance with industry or in-house design standards.

FIGS. 15-17 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 15 illustrates an example methodology 1500 for verifying channel connectivity of a proposed fiber optic network design. Initially, at 1502, component information identifying a set of selectable fiber optic network components is rendered on an interface display. The rendered network component information can include, but is not limited to, information relating to trunk cables, patch cables, fiber optic cassettes, or other such components. In some embodiments, the rendered component information can include a graphical representation of the component, a part number of the component, and engineering data for the component (e.g., fiber count, polarity, connector type, length, etc.).

At 1504, selection input identifying a subset of the fiber optic network components to be included in a fiber optic network design is received via interaction with the interface display. In one or more embodiments, the interface display can classify the selectable fiber optic network components according to component type (e.g., trunk cables, patch cables, fiber optic cassettes, etc.) and allow the user to browse available network components according to component type to facilitate selection of a desired component. The interface display can also allow the user to further filter the rendered set of network components according to other specified selection criteria, including but not limited to front or rear connector type, fiber count, polarity, or other such selection criteria. In this way, the methodology guides the user toward selection of a suitable network component.

At 1506, connectivity input defining network connections between the fiber optic network components selected at step 1504 is received via interaction with the interface display to yield a fiber optic network design. In an example embodiment, the interface display can be divided into columns, and selected network components can be assigned to each column to yield a horizontal arrangement of components and fiber optic channels. This arrangement allows the fiber optic channels of the network to be rendered as substantially horizontal signal paths. At 1508, a project file representing the fiber optic network design is generated based on the selection input received at step 1504 and the connectivity input received at step 1506. The project file is generated in a format that can be analyzed by a fiber network analysis component for component compatibility, valid connectivity, and degrees of signal degradation for each channel.

At 1510, an improper network connection defined in the fiber optic network design is identified based on an analysis of the project file generated at step 1508. The improper network connection may be, for example, a connection that yields an improper polarity, a joining of two connectors with incompatible keying or differing connector types, a connection between two incompatible network components or devices, etc. The improper connection can be identified based on a channel-by-channel analysis carried out on the project file by a fiber network analysis component (e.g., fiber network analysis component 208).

At 1512, an output identifying the improper network connection is rendered on the interface display. In one or more embodiments, the improper connection can be indicated graphically by highlighting the improper connection on a rendered drawing of the proposed network and rendering a text message providing further detail regarding the issue (e.g., a message stating that the indicated connectors have incompatible keying, or are the same gender, or yield an improper polarity). In some embodiments, in addition to indicating the improper connection, a further message can be rendered suggesting a modification to the design that will mitigate the improper connection. This can include, for example, recommending a replacement cable or network component that will eliminate the improper connection, recommending a connection modification that will eliminate the improper connection, etc.

FIG. 16 illustrates an example methodology 1600 for estimating an insertion loss or a return loss for a proposed fiber optic network design. Initially, at 1602, component information identifying a set of selectable fiber optic network components is rendered on an interface display. At 1604, selection input identifying a subset of the fiber optic network components to be included in a fiber optic network design is received via interaction with the interface display. At 1606, connectivity input defining network connections between the fiber optic network components selected at step 1604 is received via interaction with the interface display to yield a fiber optic network design. At 1608, a project file representing the fiber optic network design is generated based on the selection input received at step 1604 and the connectivity input received at step 1606. In general, steps 1602-1608 are similar to corresponding steps 1502-1508 of methodology 1500 described above in connection with FIG. 15.

At 1610, an estimate of at least one of an insertion loss or a return loss for respective channels of the fiber optic network design is estimated based on an analysis of the project file generated at step 1608. The insertion loss or return loss for a given channel can be based on estimated losses associated with each networking component in the channel path, as obtained from component definition files associated with each selected component. At 1612, the estimated insertion loss or return loss obtained at step 1610 is rendered on the interface display. In some embodiments, the estimated insertion or return loss can be compared with a defined maximum loss, and a notification can be rendered in response to determining that the estimated loss for a channel of the proposed network exceeds the defined maximum.

FIG. 17 illustrates an example methodology 1700 for verifying that a proposed fiber optic network design is in compliance with industry or in-house design standards. Initially, at 1702, component information identifying a set of selectable fiber optic network components is rendered on an interface display. At 1704, selection input identifying a subset of the fiber optic network components to be included in a fiber optic network design is received via interaction with the interface display. At 1706, connectivity input defining network connections between the fiber optic network components selected at step 1704 is received via interaction with the interface display to yield a fiber optic network design. At 1708, a project file representing the fiber optic network design is generated based on the selection input received at step 1704 and the connectivity input received at step 1706. In general, steps 1702-1708 are similar to corresponding steps 1502-1508 of methodology 1500 described above in connection with FIG. 15.

At 1710, the project file generated at step 1708 is analyzed to determine whether one or more defined design rules are violated by the proposed network design. The design rules may specify, for example, combinations of cable diameters that are not to be connected on the same channel, limitations on types of connectors or components (e.g., if a plant facility has standardized on a connector type or component), or other such design rules. At 1712, a determination is made as to whether a design rule has been violated based on the analysis performed at step 1710. If no design rule has been violated (NO at step 1712), the methodology proceeds to step 1716, where an indication that the design complies with all rules is rendered on the interface display. Alternatively, if a design rule has been violated (YES at step 1712), the methodology proceeds to step 1714, where an indication that the design does not comply with one or more design rules is rendered on the interface display. This indication can include a message indicating the nature of the non-compliance, as well as a graphical indication rendered on a network drawing highlighting the components or connections that are causing the non-compliance.

Figure 18:
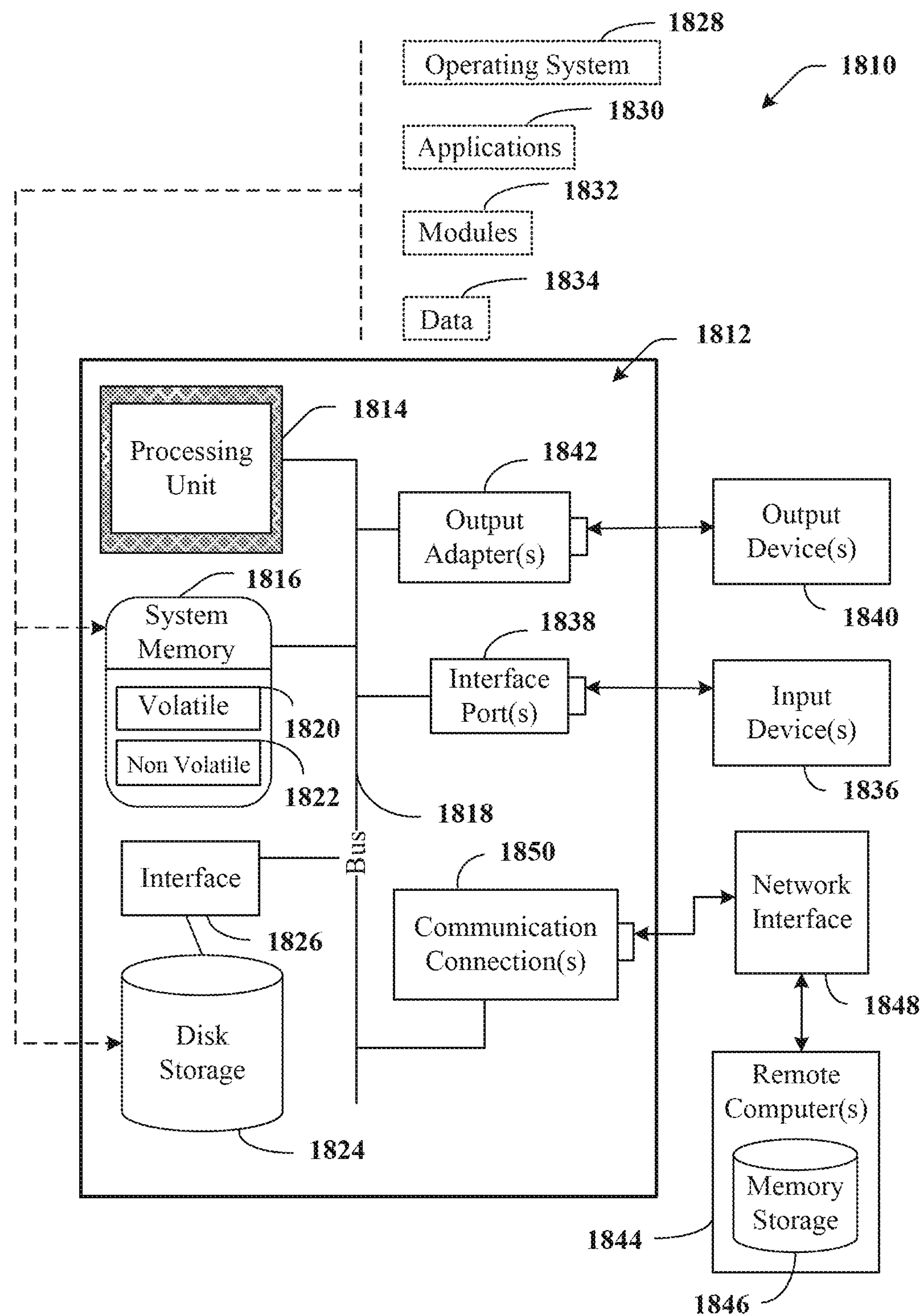
FIG. 18 is an example computing environment.
Figure 19:
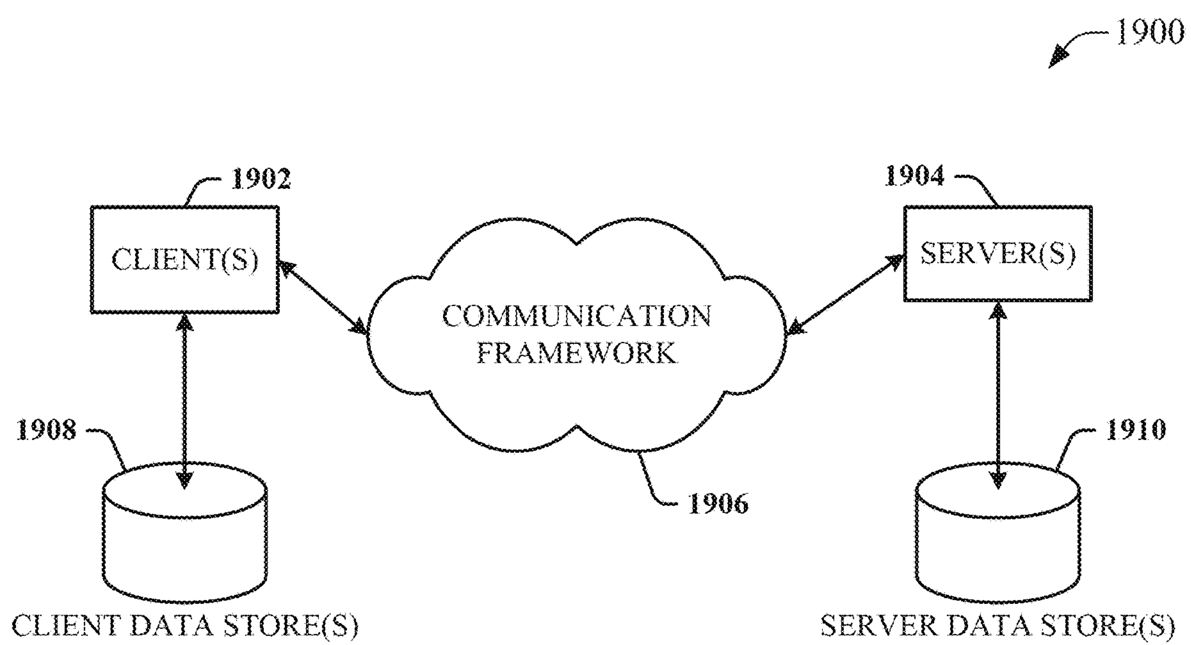
FIG. 19 is an example networking environment.

In order to provide a context for the various aspects of the disclosed subject matter, FIGS. 18 and 19 as well as the following discussion are intended to provide a brief, general description of a suitable environment in which the various aspects of the disclosed subject matter may be implemented.

With reference to FIG. 18, an example environment 1810 for implementing various aspects of the aforementioned subject matter includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Multicore microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable PROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/non-volatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer 1812. System applications 1830 take advantage of the management of resources by operating system 1828 through program modules 1832 and program data 1834 stored either in system memory 1816 or on disk storage 1824. It is to be appreciated that one or more embodiments of the subject disclosure can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapters 1842 are provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the system bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample computing environment 1900 with which the disclosed subject matter can interact. The sample computing environment 1900 includes one or more client(s) 1902. The client(s) 1902 can be hardware and/or software (e.g., threads, processes, computing devices). The sample computing environment 1900 also includes one or more server(s) 1904. The server(s) 1904 can also be hardware and/or software (e.g., threads, processes, computing devices). The servers 1904 can house threads to perform transformations by employing one or more embodiments as described herein, for example. One possible communication between a client 1902 and servers 1904 can be in the form of a data packet adapted to be transmitted between two or more computer processes. The sample computing environment 1900 includes a communication framework 1906 that can be employed to facilitate communications between the client(s) 1902 and the server(s) 1904. The client(s) 1902 are operably connected to one or more client data store(s) 1908 that can be employed to store information local to the client(s) 1902. Similarly, the server(s) 1904 are operably connected to one or more server data store(s) 1910 that can be employed to store information local to the servers 1904.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:

a memory that stores executable components; and a processor, operatively coupled to the memory, that executes the executable components, the executable components comprising:

a user interface component configured to render a network design interface configured to receive, via interaction with the network design interface, component selection data identifying fiber optic network components, selected from component definition data defining available fiber optic network components, to be included in a fiber optic network design, wherein the network design interface comprises columns to which the fiber optic network components are assigned;

a fiber network building component configured to define connections between the fiber optic network components based on component connectivity data, received via interaction with the network design interface, that assigns the fiber optic network components to respective columns of the columns to yield a horizontal arrangement of the fiber optic network components representing a fiber optic channel, and to generate fiber network definition data representing the fiber optic network design based on the component selection data and the component connectivity data; and a fiber network analysis component configured to perform an analysis on the fiber network definition data and to identify a design problem based on a result of the analysis, wherein the user interface component is configured to render an output identifying the design problem on the network design interface.

2. The system of claim 1, wherein the design problem comprises at least one of an incorrect polarity, an invalid fiber connection, an incompatibility between two or more of the fiber optic network components, a non-compliance with a defined industry standard or connection rule, or an excessive amount of insertion loss or return loss on one or more channels of the fiber optic network design.

3. The system of claim 1, wherein the user interface component is further configured to receive component criterion data indicating one or more component specifications, and to render, for selection, a filtered subset of the available fiber optic network components that satisfy the one or more component specifications.

4. The system of claim 1, wherein the fiber optic network components comprise at least one of a fiber optic trunk cable, a fiber optic patch cable, a fiber optic cassette, a fiber optic connector, or a fiber optic network device.

5. The system of claim 1, wherein the fiber network building component defines, as part of the fiber network definition data, connections between the fiber optic network components based on placement of the fiber optic network components in the respective columns.

6. The system of claim 1, wherein the fiber network building component is further configured to receive network specification data indicating one or more network design parameters, and to select a subset of the available fiber optic network components to be included in the fiber optic network design based on the network specification data.

7. The system of claim 1, wherein the executable components further comprise a fiber network export component configured to convert the fiber network definition data to at least one of a drawing file illustrating the fiber optic network design, a web page file illustrating the fiber optic network design, or a bill of materials file comprising part numbers and descriptions of the fiber optic network components used in the fiber optic network design.

8. The system of claim 7, wherein the fiber network export component is further configured to generate connector compatibility report data identifying component connections defined by the fiber network definition data and indicating which of the component connections are validated by the fiber network analysis component based on the result of the analysis.

9. The system of claim 7, wherein the fiber network export component is further configured to generate compliance report data identifying network connection rules defined by connection rules data, and further identifying which of the network connection rules are violated by the fiber optic network design based on the result of the analysis.

10. The system of claim 1, wherein the executable components further comprise a component data import component configured to import a drawing file containing data center information that identifies one or more structural components of a data center and dimension information for the one or more structural components, and the fiber network building component is configured to select a subset of the available fiber optic network components to be included in the fiber optic network design based on the data center information extracted from the drawing file.

11. A method, comprising:

rendering, by a system comprising at least one processor, a network design interface display;

receiving, by the system via interaction with the network design interface display, component selection data specifying fiber optic network components, selected from component definition data defining available fiber optic network components, to be included in a fiber optic network design;

receiving, by the system via interaction with the network design interface display, component connectivity data that assigns the fiber optic network components to respective columns of the network design interface display to yield a representation of a fiber optic channel comprising a horizontal arrangement of the fiber optic network components;

generating, by the system based on the component selection data and the component connectivity data, a fiber system project file defining the fiber optic network design;

performing, by the system, an analysis on the fiber system project file;

identifying, by the system based on a result of the analysis, a fault in the fiber optic network design; and outputting, by the system based on the result of the analysis, an indication of the fault.

12. The method of claim 11, wherein the identifying the fault comprises identifying at least one of an incorrect polarity, an invalid fiber connection, an incompatibility between two or more of the fiber optic network components, a non-compliance with a defined industry standard or connection rule, or an excessive amount of insertion loss or return loss on one or more channels of the fiber optic network design.

13. The method of claim 11, further comprising:

receiving, by the system, component criterion data defining a component requirement;

rendering, by the system, a filtered subset of the available fiber optic network components that satisfy the component requirement; and receiving, by the system, selection input identifying one of the filtered subset of the available fiber optic network components to be included in the fiber optic network design.

14. The method of claim 11, wherein the receiving the component selection data comprises receiving data specifying, as at least one of the fiber optic network components, at least one of a fiber optic trunk cable, a fiber optic patch cable, a fiber optic cassette, a fiber optic connector, or a fiber optic network device.

15. The method of claim 11, wherein the generating the fiber system project file comprises:

determining connections between the fiber optic network components based on assignments of the fiber optic network components to the respective columns, and generating the fiber system project file to define the connections between the fiber optic network components.

16. The method of claim 11, further comprising:

receiving, by the system, network specification data indicating one or more network design parameters; and selecting, by the system, a subset of the available fiber optic network components to be included in the fiber optic network design based on the network specification data.

17. The method of claim 11, further comprising converting, by the system, the fiber system project file to at least one of a drawing file illustrating the fiber optic network design, a web page file illustrating the fiber optic network design, or a bill of materials file identifying part numbers and descriptions of the fiber optic network components used in the fiber optic network design.

18. A non-transitory computer-readable medium having stored thereon instructions that, in response to execution, cause a system comprising a processor to perform operations, the operations comprising:

rendering a graphical interface of a fiber network design platform, wherein the graphical interface comprises an area divided into columns;

receiving, via interaction with the graphical interface, component selection data that selects fiber optic network components from available fiber optic components defined by component definition data;

receiving, via interaction with the graphical interface, component connectivity data that assigns the fiber optic network components to respective columns of the columns to yield a fiber optic network design comprising a data channel represented by a horizontal arrangement of the fiber optic network components;

generating fiber network definition data defining the fiber optic network design based on the component selection data and the component connectivity data;

analyzing the fiber network definition data for design faults;

identifying, based on a result of the analyzing, a design fault in the fiber optic network design; and generating an output identifying the design fault.

19. The non-transitory computer-readable medium of claim 18, wherein the identifying the design fault comprises identifying at least one of an incorrect polarity, an invalid fiber connection, an incompatibility between two or more of the fiber optic network components, a non-compliance with a defined industry standard or connection rule, or an excessive amount of insertion loss or return loss on one or more channels of the fiber optic network design.

20. The non-transitory computer-readable medium of claim 18, wherein the receiving the component selection data comprises receiving data specifying, as at least one of the fiber optic network components, at least one of a fiber optic trunk cable, a fiber optic patch cable, a fiber optic cassette, a fiber optic connector, or a fiber optic network device.

* * * * *